United States Patent
Oshima

(10) Patent No.: US 7,782,362 B2
(45) Date of Patent: Aug. 24, 2010

(54) IMAGE PICKUP DEVICE FOR CHANGING A RESOLUTION OF FRAMES AND GENERATING A STATIC IMAGE BASED ON INFORMATION INDICATING THE FRAMES

(75) Inventor: Mitsuaki Oshima, Kyoto (JP)

(73) Assignee: Panasonic Corporation, Osaka (JP)

( * ) Notice: Subject to any disclaimer, the term of this patent is extended or adjusted under 35 U.S.C. 154(b) by 742 days.

(21) Appl. No.: 10/561,384

(22) PCT Filed: Jun. 15, 2004

(86) PCT No.: PCT/JP2004/008702

§ 371 (c)(1),
(2), (4) Date: Dec. 16, 2005

(87) PCT Pub. No.: WO2004/112380

PCT Pub. Date: Dec. 23, 2004

(65) Prior Publication Data

US 2007/0098381 A1  May 3, 2007

(30) Foreign Application Priority Data

Jun. 17, 2003 (JP) .............................. 2003-172687
Dec. 26, 2003 (JP) .............................. 2003-435934

(51) Int. Cl.
  *H04N 5/225* (2006.01)
  *H04N 5/262* (2006.01)
(52) U.S. Cl. .............................. 348/208.6; 348/208.13; 348/208.15; 348/240.2
(58) Field of Classification Search .............. 348/208.6, 348/240.2
See application file for complete search history.

(56) References Cited

U.S. PATENT DOCUMENTS

| | | | | | |
|---|---|---|---|---|---|
| 5,502,483 | A | * | 3/1996 | Takase et al. | 348/208.13 |
| 5,502,484 | A | * | 3/1996 | Okada | 348/208.6 |
| 5,973,733 | A | * | 10/1999 | Gove | 348/208.13 |
| 6,122,004 | A | * | 9/2000 | Hwang | 348/208.13 |

(Continued)

FOREIGN PATENT DOCUMENTS

JP          60143330  A  *  7/1985

(Continued)

OTHER PUBLICATIONS

Office Action from corresponding Japanese Application No. 2007-195875 dated Apr. 16, 2008.

(Continued)

*Primary Examiner*—Ngoc-Yen T Vu
(74) *Attorney, Agent, or Firm*—Snell & Wilmer L.L.P.

(57) ABSTRACT

The image pickup apparatus of the present invention is for taking a static image during a predetermined exposure period. The image pickup apparatus includes: a shaking motion detecting section for detecting an amount of shaking motion between a plurality of frames representing the static image; a shaking motion correcting section for correcting a plurality of frame information indicating the plurality of frames in accordance with the detected amount of the shaking motion; a storage section for storing the plurality of frame information subjected to the correction of the shaking motion; and an information generating section for generating static image information indicating the static image based on the plurality of frame information stored in the storage section.

14 Claims, 24 Drawing Sheets

U.S. PATENT DOCUMENTS

| | | | |
|---|---|---|---|
| 6,181,379 B1 * | 1/2001 | Kingetsu et al. | 348/364 |
| 6,424,372 B1 * | 7/2002 | Kaneda et al. | 348/207.99 |
| 6,778,210 B1 * | 8/2004 | Sugahara et al. | 348/208.4 |
| 6,963,361 B1 * | 11/2005 | Kawahara et al. | 348/208.99 |
| 7,057,645 B1 * | 6/2006 | Hara et al. | 348/208.6 |
| 2002/0063779 A1 * | 5/2002 | Kaneda et al. | 348/208 |
| 2003/0076408 A1 * | 4/2003 | Dutta | 348/61 |

FOREIGN PATENT DOCUMENTS

| | | |
|---|---|---|
| JP | 09-261526 | 10/1997 |
| JP | 11-075105 | 3/1999 |
| JP | 2000-069352 | 3/2000 |
| JP | 2000-224460 | 8/2000 |
| JP | 2000-224470 | 8/2000 |
| JP | 2000-341577 | 12/2000 |
| JP | 2001-086398 | 3/2001 |
| JP | 2001-238190 | 8/2001 |
| JP | 2001230965 A * | 8/2001 |
| JP | 2003-087645 | 3/2003 |
| JP | 2005-033785 | 2/2005 |

OTHER PUBLICATIONS

Office Action from corresponding Japanese Application No. 2007-195875 dated Apr. 13, 2009.

* cited by examiner

FIG.16
(a) Vertical addition
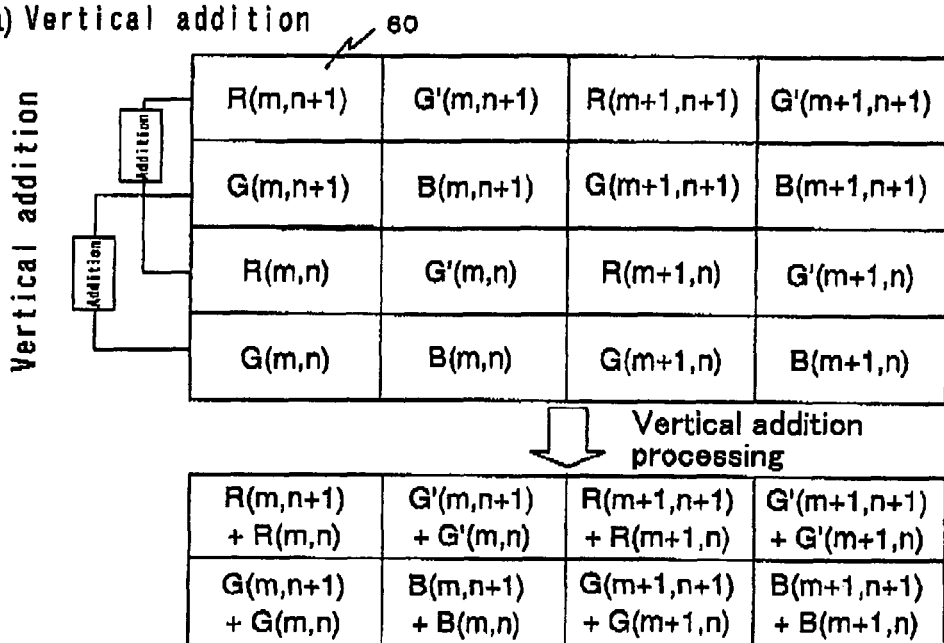
(b) Horizontal addition
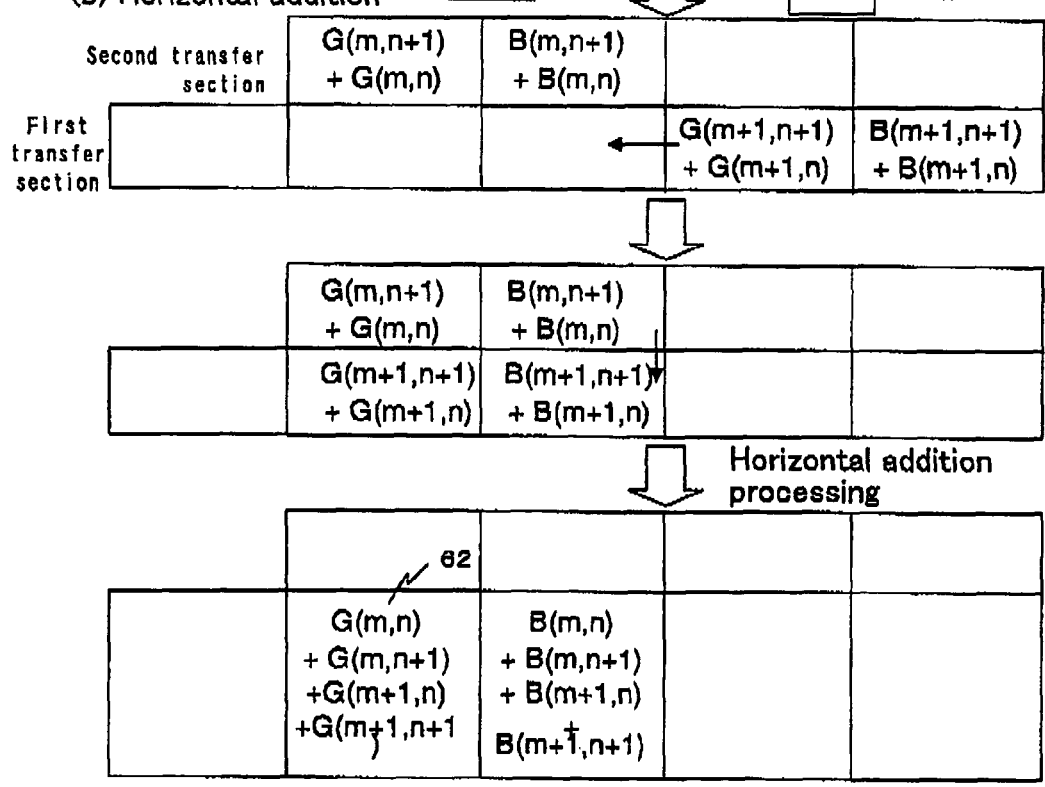

FIG.18
(a) Principle of interpolation (Reduction)
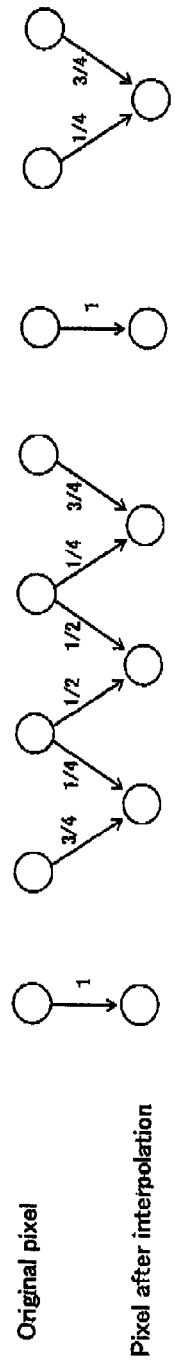
(b) Principle of interpolation (Enlargement)
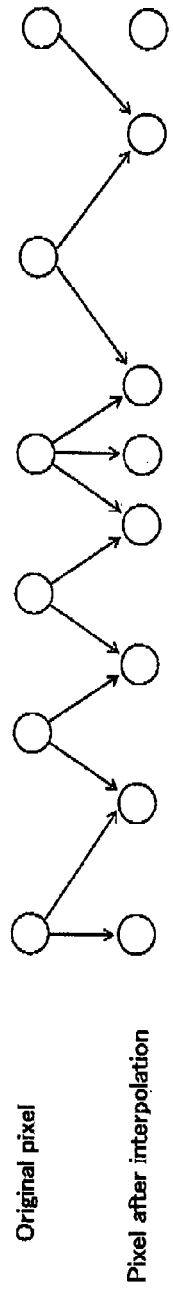
(c) Shaking motion correction with high resolution
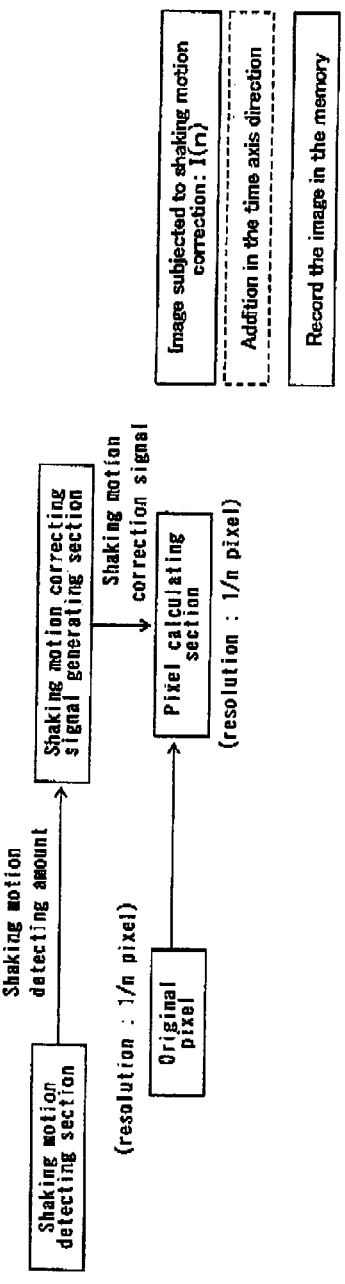

FIG.23
(a) 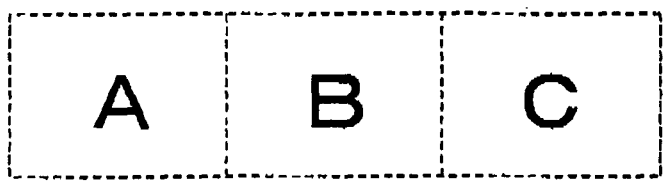
(b) 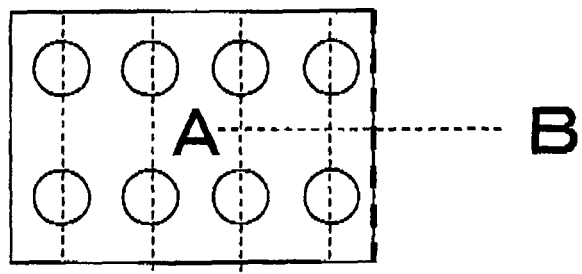
(c) 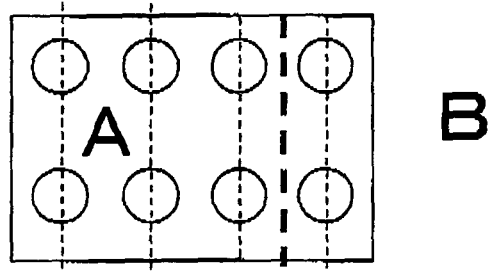
(d) 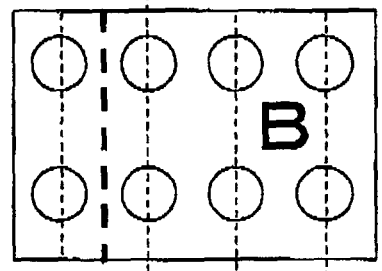
(e) 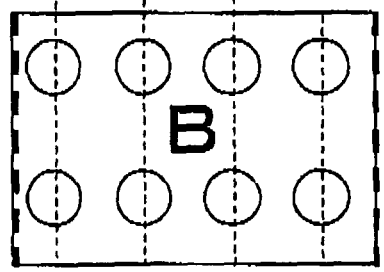

IMAGE PICKUP DEVICE FOR CHANGING A RESOLUTION OF FRAMES AND GENERATING A STATIC IMAGE BASED ON INFORMATION INDICATING THE FRAMES

TECHNICAL FIELD

The present invention relates to an information generating apparatus for generating information indicating a static image, and an image pickup apparatus and an image pickup method for taking a static image during a predetermined exposure period.

BACKGROUND ART

As a method for correcting the camera shaking of an image, an optical camera shaking correction method and an electronic camera shaking correction method are known (for example, see Japanese Laid-Open Patent Publication No. 60-143330).

The technique using the optical camera shaking correction method is known as a technique for correcting the camera shaking of a static image. This technique is effective for taking a static image without degrading the quality of the image. However, it requires an optical driving section. For this reason, a reduction in the size of the apparatus is limited.

The technique using the electronic camera shaking correction method is known as a technique for correcting the camera shaking of a moving image. This technique does not require any optical driving section. Therefore, it is possible to reduce the size of the apparatus. However, it has been considered that this technique is not effective for correcting the camera shaking of a static image. This is because this technique performs only a correction between a plurality of frames and it is impossible in principle to perform the camera, shaking correction for a static image consisting of a single frame.

The present invention is provided to solve the problems described above. The object of the present invention is to provide an information generating apparatus, an image pickup apparatus and an image pickup method, which are capable of correcting the camera shaking of a static image using an electronic camera shaking correction method.

DISCLOSURE OF THE INVENTION

An image generating apparatus of the present invention includes: a storage section for storing a plurality of frame information; and an information generating section for generating static image information indicating a static image based on the plurality of frame information stored in the storage section, wherein the plurality of frame information is information indicating a plurality of frames representing a static image taken during a predetermined exposure period, and the information has been corrected in accordance with an amount of shaking motion between the plurality of frames, thereby achieving the object described above.

The information generating section may generate the static image information by simultaneously calculating the plurality of frame information stored in the storage section.

The information generating section may generate the static image information by sequentially calculating each of the plurality of frame information stored in the storage section.

The plurality of frame information may be generated based on Information generated by adding information indicating a plurality of pixels included in an image pickup plane of an image pickup element in at least one of a horizontal direction and a vertical direction.

An image pickup apparatus of the present invention for taking a static image during a predetermined exposure period, includes: a shaking motion detecting section for detecting an amount of shaking motion between a plurality of frames representing the static image; a shaking motion correcting section for correcting a plurality of frame information indicating the plurality of frames in accordance with the detected amount of the shaking motion; a storage section for storing the plurality of frame information subjected to the correction of the shaking motion; and an information generating section for generating static image information indicating the static image based on the plurality of frame information stored in the storage section, thereby achieving the object described above.

The information generating section may generate the static image information by simultaneously calculating the plurality of frame information stored in the storage section.

The information generating section may generate the static image information by sequentially calculating each of the plurality of frame information stored in the storage section.

The image pickup apparatus may further include a resolution changing section for changing a resolution of the plurality of frames in accordance with the amount of the shaking motion.

The image pickup apparatus may further include a frame rate changing section for changing a frame rate in accordance with the amount of the shaking motion, wherein the frame rate indicates the number of the plurality of frames representing the static image taken per unit time.

The image pickup apparatus may further include a resolution changing section for changing a resolution of the plurality of frames in accordance with a brightness.

The image pickup apparatus may further include a resolution changing section for changing a resolution of the plurality of frames in accordance with a zoom ratio.

The shaking motion detecting section may detect the amount of the shaking motion based on information generated by adding information indicating a plurality of pixels included in an image pickup plane of an image pickup element, and the shaking motion correcting section may correct the plurality of frame information by cutting out a part of the plurality of frame information in accordance with the amount of the shaking motion.

The shaking motion detecting section may detect the amount of the shaking motion based not on information generated based on a plurality of pixels Included in an image pickup plane of an image pickup element.

The image pickup apparatus may further include a determining section for determining whether or not the predetermined exposure time is greater than a predetermined value, and wherein, when it is determined that the predetermined exposure time is greater than the predetermined value, the shaking motion detecting section detects the amount of the shaking motion based on information generated by adding information indicating a plurality of pixels included in an image pickup plane of an image pickup element.

An image pickup method of the present invention for taking a static image during a predetermined exposure period, includes the steps of: detecting an amount of shaking motion between a plurality of frames representing the static image; correcting a plurality of frame information indicating the plurality of frames in accordance with the detected amount of the shaking motion; storing the plurality of frame information subjected to the correction of the shaking motion; and generating static image information indicating the static image based on the plurality of frame information stored in the storage section, thereby achieving the object described above.

An image pickup apparatus of the present invention for taking a static image during a predetermined exposure period, includes: a shaking motion amount detecting section for detecting an amount of shaking motion between a plurality of frames representing the static image; and a display section for displaying the detected amount of the shaking motion after the predetermined exposure period passes, thereby achieving the object described above.

An image pickup apparatus of the present invention for taking a static image during a predetermined exposure period, includes: a shaking motion amount detecting section for detecting an amount of shaking motion between a plurality of frames representing the static image; a determination section for determining whether or not the amount of the shaking motion is larger than a predetermined value; and an output section for outputting a result of the determination, thereby achieving the object described above.

The output section may display the result of the determination when it is determined that the amount of the shaking motion is larger than the predetermined value.

The output section may generate a sound when it is determined that the amount of the shaking motion is larger than the predetermined value.

The output section may vibrate when it is determined that the amount of the shaking motion is larger than the predetermined value.

BRIEF DESCRIPTION OF THE DRAWINGS

FIG. 16 is a diagram showing a method for adding pixels in an in-plane direction.

FIG. 18 is a diagram showing a principle for the reducing interpolation, a principle of the enlarging interpolation and a principle of correcting the shaking motion with a high resolution.

FIG. 23 is a diagram showing a display of the boundary indicator 97 for taking a picture in a panning manner or in a panoramic manner.

DETAILED DESCRIPTION

Hereinafter, embodiments of the present invention will be described below with reference to the drawings.

1. Image Pickup Apparatus

Figure 1:
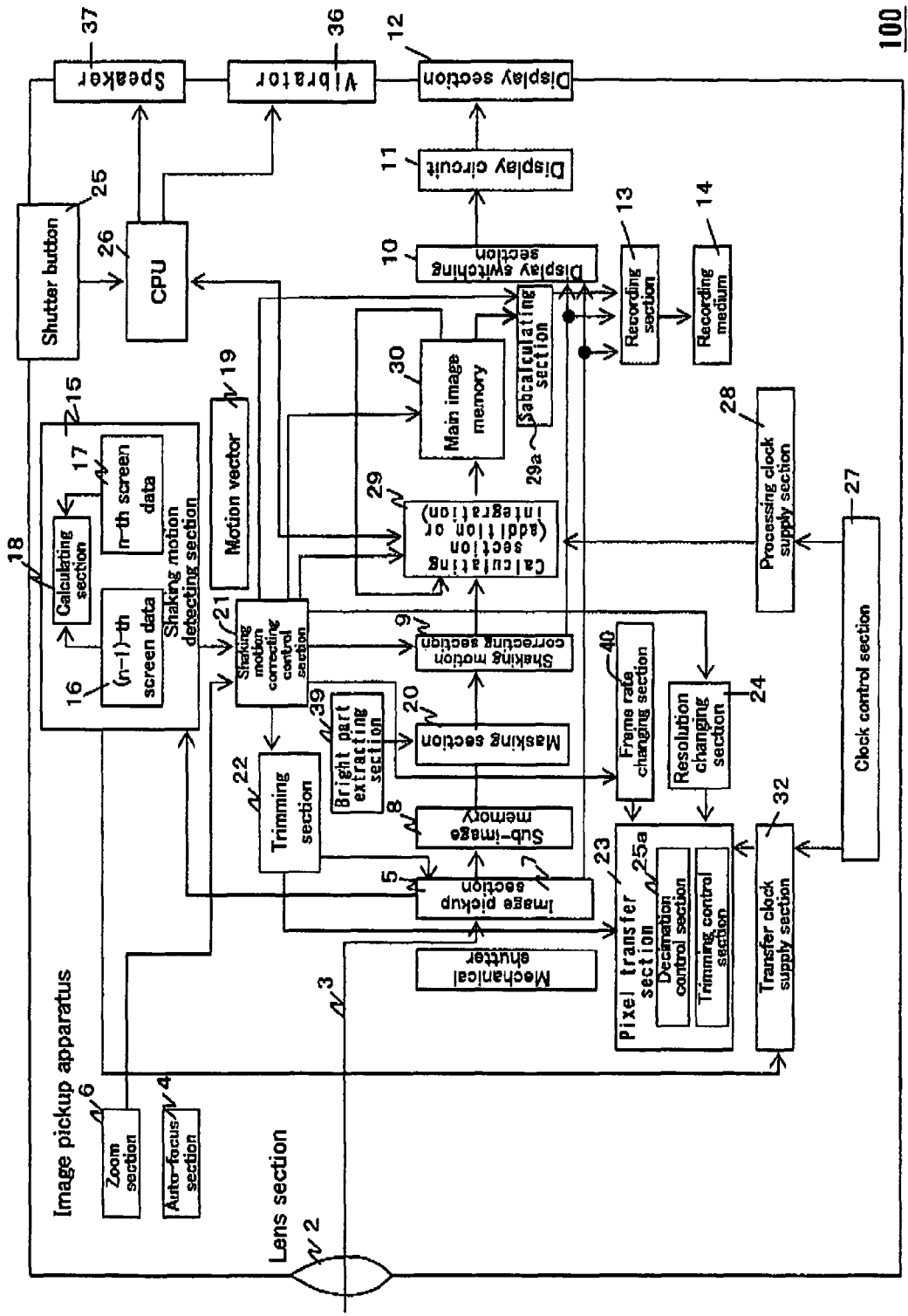
FIG. 1 is a diagram showing an image pickup apparatus 100 according to an embodiment of the present invention.

FIG. 1 shows an image pickup apparatus 100 according to an embodiment of the present invention.

The image pickup apparatus 100 takes a static image (i.e., a still image) during a predetermined exposure period. The image pickup apparatus 100 includes a lens section 2 for receiving light incident on the image pickup apparatus 100 from the outside of the image pickup apparatus 100; an auto-focusing section 4 for automatically adjusting a focus of the light 3; a zoom section 6 for setting a zoom ratio of the lens section 2; and an image pickup section 5. An optical image is formed oh the image pickup section 5. The image pickup section 5 outputs data indicating the formed optical image. The image pickup section 5 is, for example, a CCD or a MOS type imaging device. The focus of the light 3 from the lens section 2 is automatically adjusted by the auto-focusing section 4. The zoom ratio of the lens section 2 is set by the zoom section 6. An optical image 7 is formed on the image pickup section 5.

The image pickup apparatus 100 further includes a display switching section 10; a display circuit 11; a display section 12; a recording section 13 and a recording medium 14. When a static image is taken without correcting any shaking motion in static image data representing the static image, the output data output from the image pickup section 5 is directly sent to the display switching section 10. When the static image is displayed, the output data output from the image pickup section 5 is displayed on the display section 12 by the display circuit 11. When the static image is recorded, the output data output from the image pickup section 5 is recorded on the recording medium 14 by the recording section 13.

The image pickup apparatus 100 further includes a shutter button 25; a sub-image memory 8 for storing data; a shaking motion detecting section 15 for detecting an amount of the shaking motion between a plurality of images (frames) representing a static image taken; a shaking motion correcting section 9 for correcting a plurality of image information indicating the plurality of images (frames) in accordance with the amount of the detected shaking motion; a shaking motion correcting control section 21; a trimming section 22 to be controlled to remove a shaking motion in a longitudinal direction; a resolution changing section 24 for changing a resolution of an image indicated by screen data; a decimation control section 25a; a pixel transfer section 23; and a frame rate changing section 40 for changing a frame rate in accordance with the amount of the shaking motion. The shaking motion detecting section 15 includes a calculating section 18 for calculating data input to the shaking motion detecting section 15, a first memory 16 and a second memory 17. The shaking motion correcting control section 21 controls each of the components in order to correct the output data output from the image pickup section 5 in accordance with the amount of the detected shaking motion.

When a static image is taken while correcting the shaking motion in static image data representing the static image (i.e., a shaking motion correcting mode is set to ON), the output data output from the image pickup section 5 is accumulated in the sub-image memory 8 before the shutter button 25 is pressed down. The output data output from the image pickup section 5 is input to the shaking motion detecting section 15. The calculating section 18 calculates a plurality of output data which are input to the shaking motion detecting section 15 (for example, the (n−1)-th image data (i.e., previous screen data) and the n-th image data (i.e., current screen data)) so as to obtain shaking motion information indicating the shaking motion. The shaking motion information is a motion vector 19. When the image pickup apparatus 100 includes a longitudinal oscillating gyro and a lateral oscillating gyro, it is also possible to detect an amount of the shaking motion in the longitudinal direction and an amount of the shaking motion in the lateral direction. In this case, the shaking motion information is an amount of the shaking motion in the longitudinal direction and an amount of the shaking motion in the lateral direction.

The shaking motion correcting control section 21 controls the trimming section 22 and the pixel transfer section 23, such that the shaking motion in the longitudinal direction can be removed. The shaking motion correcting control section 21 controls the shaking motion correcting section 9, such that the shaking motion in the lateral direction can be removed. Thus, it is possible to correct the shaking motion in the longitudinal direction in the image data and the shaking motion in the lateral direction in the image data. As a result, image data subjected to the correction of the shaking motion can be obtained.

The image data subjected to the correction of the shaking motion is sequentially output to the display section 12 via the display switching section 10. On the display section 12, a user can visually recognize continuous images which are subjected to the correction of the shaking motion at a predetermined frame rate.

On the display section 12, it is also possible to display an image corresponding to a part of the entire image represented by the image data which is subjected to the correction of the shaking motion. Accordingly, it is possible to accurately perform a framing of an object. In this case, the resolution is set to a resolution which is lower than a resolution when a static image is taken, by the resolution changing section 24 and the decimation control section 25a. Accordingly, it is possible to increase the frame rate, thereby increasing the number of frames to be displayed per second. As a result, the user can visually recognize the image of the object more smoothly.

The recording section 13 may record a plurality of images having a high frame rate on the recording medium 14 as a moving image.

The resolution changing section 24 changes the resolution of a plurality of frames in accordance with at least one of a brightness, an amount of the shaking motion, and a zoom rate, for example.

The image pickup apparatus 100 further includes a clock control section 27; a transfer clock supply section 32; a processing clock supply section 28; and a CPU 26. When the user presses down the shutter button 25 halfway, the CPU 26 provides an instruction to the clock control section 27, such that the processing clock supply section 28 starts the operation of a clock (e.g., a clock of a calculating section 29 and the like) or increases a clock speed.

The image pickup apparatus 100 further includes a main image memory 30 for storing a plurality of image information subjected to the correction of the shaking motion; a calculating section 29 for generating static image information indicating a static image based on the plurality of image information stored in the storage section; and a sub-calculating section 29a. The detailed description of the functions of the calculating section 29, the main image memory 30 and the sub-calculating section 29a will be provided later.

The image pickup apparatus 100 further includes a masking section 20 and a bright part extracting section 39. The detailed description of the functions of the masking section 20 and the bright part extracting section 39 will be provided later.

The image pickup apparatus 100 further includes a vibrator 36 and a speaker 37. The detailed description of the functions of the vibrator 36 and the speaker 37 will be provided later.

Figure 2:
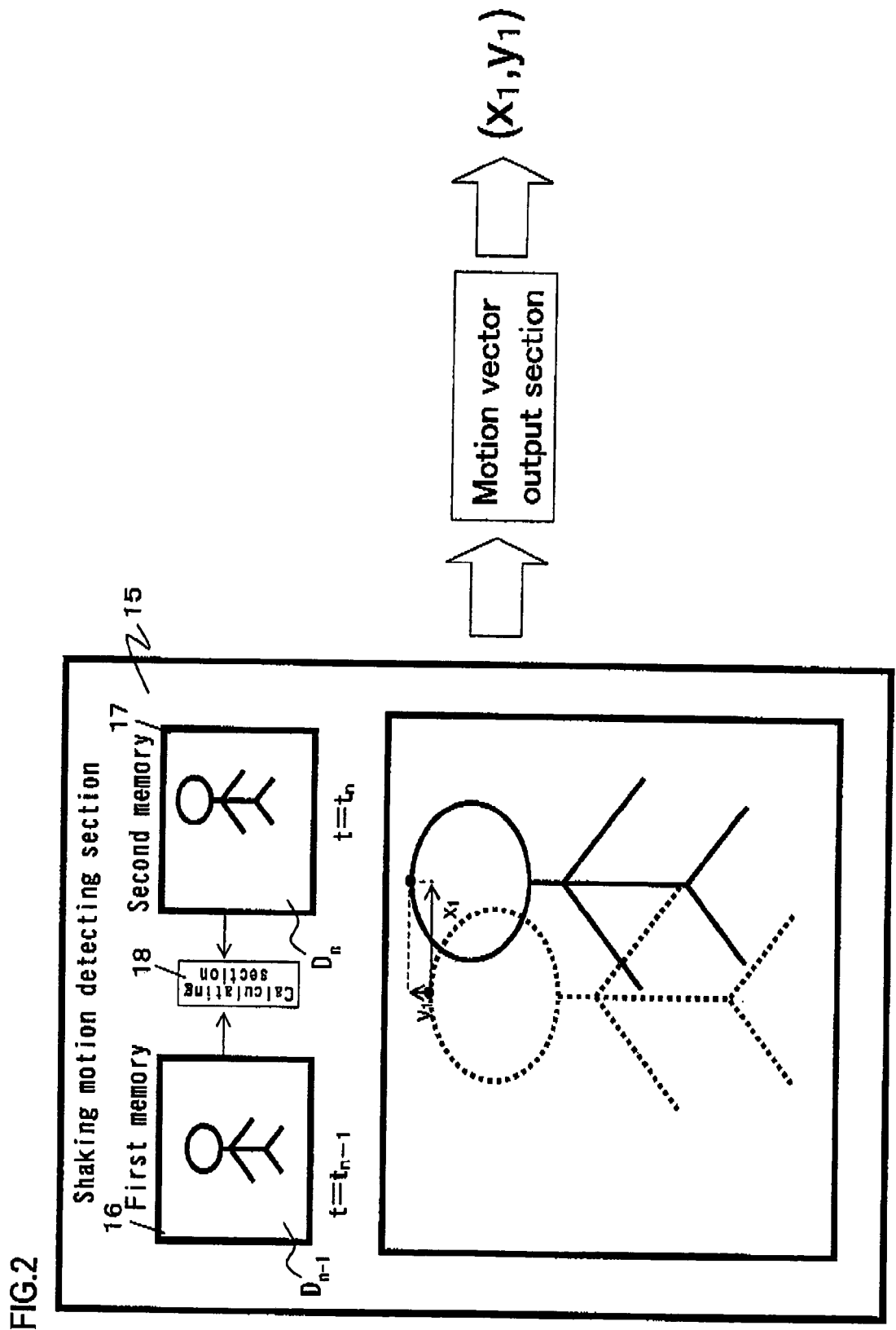
FIG. 2 is a view showing a structure of the shaking motion detecting section 15.

FIG. 2 shows a structure of the shaking motion detecting section 15. The shaking motion detecting section 15 includes the calculating section 18, the first memory 16 and the second memory 17.

In the first memory 16, image data indicating image $D_{n-1}$ taken at time $t=t_{n-1}$ is stored. In the second memory 17, image data indicating image $D_n$ taken at time $t=t_n$ is stored. The amount of shaking motion (e.g., a motion vector $(x_1, y_1)$) between the two image data (i.e., the image data indicating image $D_{n-1}$ and the image data indicating image $D_n$) is detected based on data indicating two images (image data indicating the image $D_{n-1}$ and image data indicating the image data $D_n$), and data indicating the amount of the shaking motion is output.

2. Operation for Correcting Shaking Motion

Figure 3:
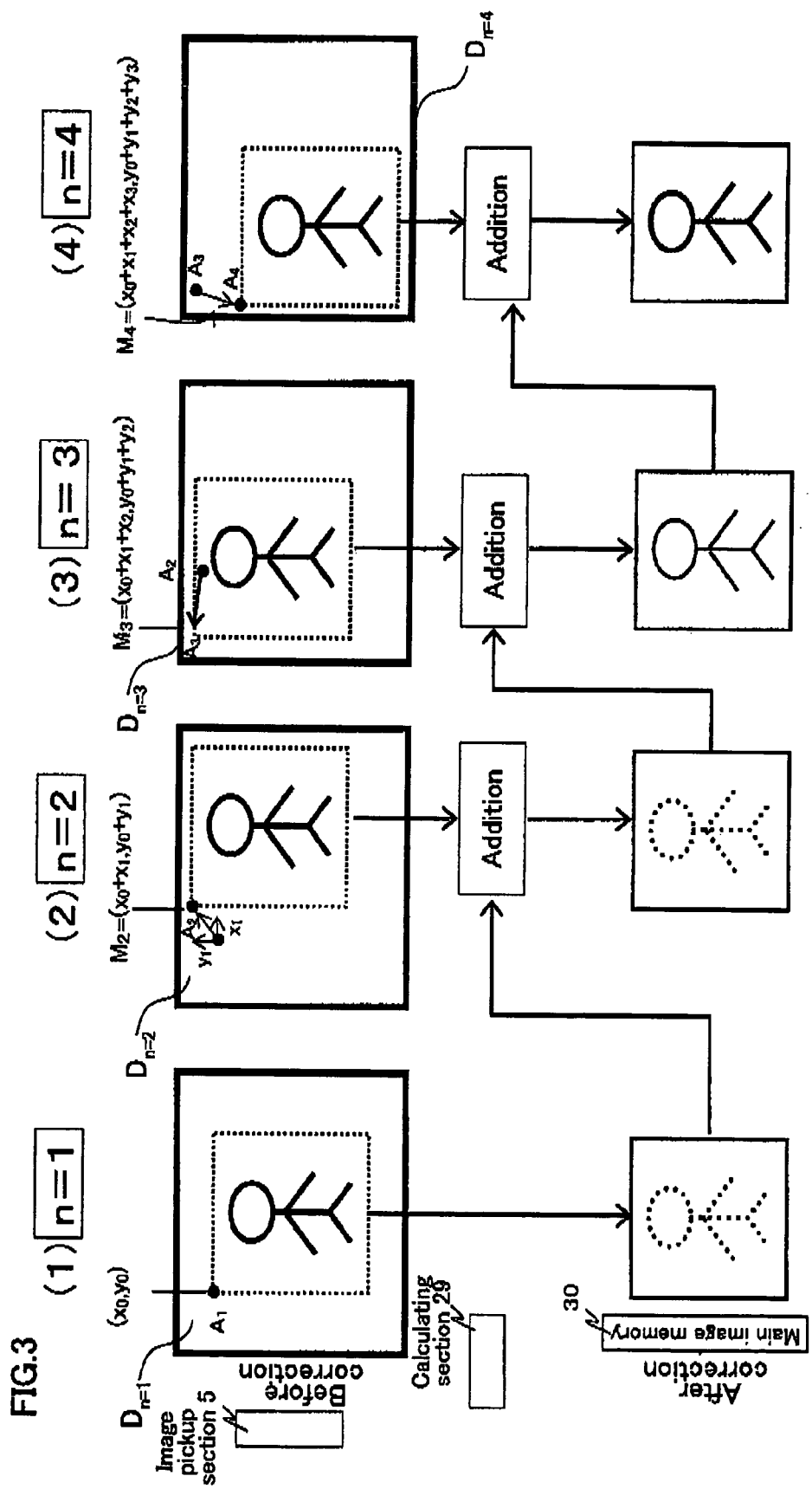
FIG. 3 is a view showing an operation for correcting the shaking motion according to an embodiment of the present invention.

FIG. 3 shows an operation for correcting the shaking motion according to an embodiment of the present invention. The shaking motion is caused by at least one hand of an operator.

Image $D_{n=1}$ indicates an image taken at time of n=1, image $D_{n=2}$ indicates an image taken at time of n=2, image $D_{n=3}$ indicates an image taken at time of n=3, and image $D_{n=4}$ indicates an image taken at time of n=4.

Image data indicating image $D_{n=1}$ is stored in the main image memory 30.

Image data indicating image $D_{n=2}$ is corrected in accordance with a shaking motion amount $M_2$ ($M_2=(x_o+x_1, y_o+y_1)$). The corrected image data is added to the image data indicating image $D_{n=1}$ stored in the main image memory 30 by the calculating section 29. Data indicating the result of the addition is stored in the main image memory 30. Since the corrected image data is added to image data indicating image $D_{n=1}$, the static part of an object is accurately overlapped. As a result, an SN ratio of the image is increased.

Image data indicating image $D_{n=3}$ is corrected in accordance with a shaking motion amount $M_3$ ($M_3=(x_0+x_1+x_2, y_0+y_1+y_2)$). The corrected image data is added to the data indicating the result of the addition stored in the main image memory 30 by the calculating section 29. Data indicating the result of the addition is stored in the main image memory 30.

Image data indicating image $D_{n=4}$ is corrected in accordance with a shaking motion amount $M_4$ ($M_4=(x_0+x_1+x_2+x_3, y_0+y_1+y_2+y_3)$). The corrected image data is added to the date indicating the result of the addition stored in the main image memory 30 by the calculating section 29. Data indicating the result of the addition is stored in the main image memory 30.

By repeating the addition of the data, the four image data which indicate almost identical images are stored in the main image memory 30, in which data indicating a static image is generated. When the shutter is 100% opened during an exposure period, it is possible to obtain an image having a brightness which is almost the same as the brightness of the image obtained when the shutter is continuously opened during a period from time of n=1 to time of n=4. It is also possible to correct a shaking motion for each screen.

By appropriately setting the parameters such as a shutter opening time (exposure time) and a frame rate in accordance with the degree of the shaking motion (i.e., a shaking motion amount) and the zoom ratio, it is possible to electronically correct the shaking motion without degrading the S/N. When the shutter opening time for taking each image is shortened, the degradation of the image due to the correction of the shaking motion is reduced, but the amount of light is also reduced. In this case, the number of frames to be taken should be increased.

In an embodiment of the present invention, it is possible to obtain an optimum frame rate by increasing the frequency of a transfer clock to increase the frame rate or by decreasing a resolution to increase the frame rate. As a result, an advantageous effect that there is a large applicable range can be obtained.

The calculation performed by the calculating section 29 is not limited to the addition. The calculation may be an integration, for example, as long as data indicating a static image can be generated based on a plurality of image data (frame information).

3. Masking Operation

Figure 4:
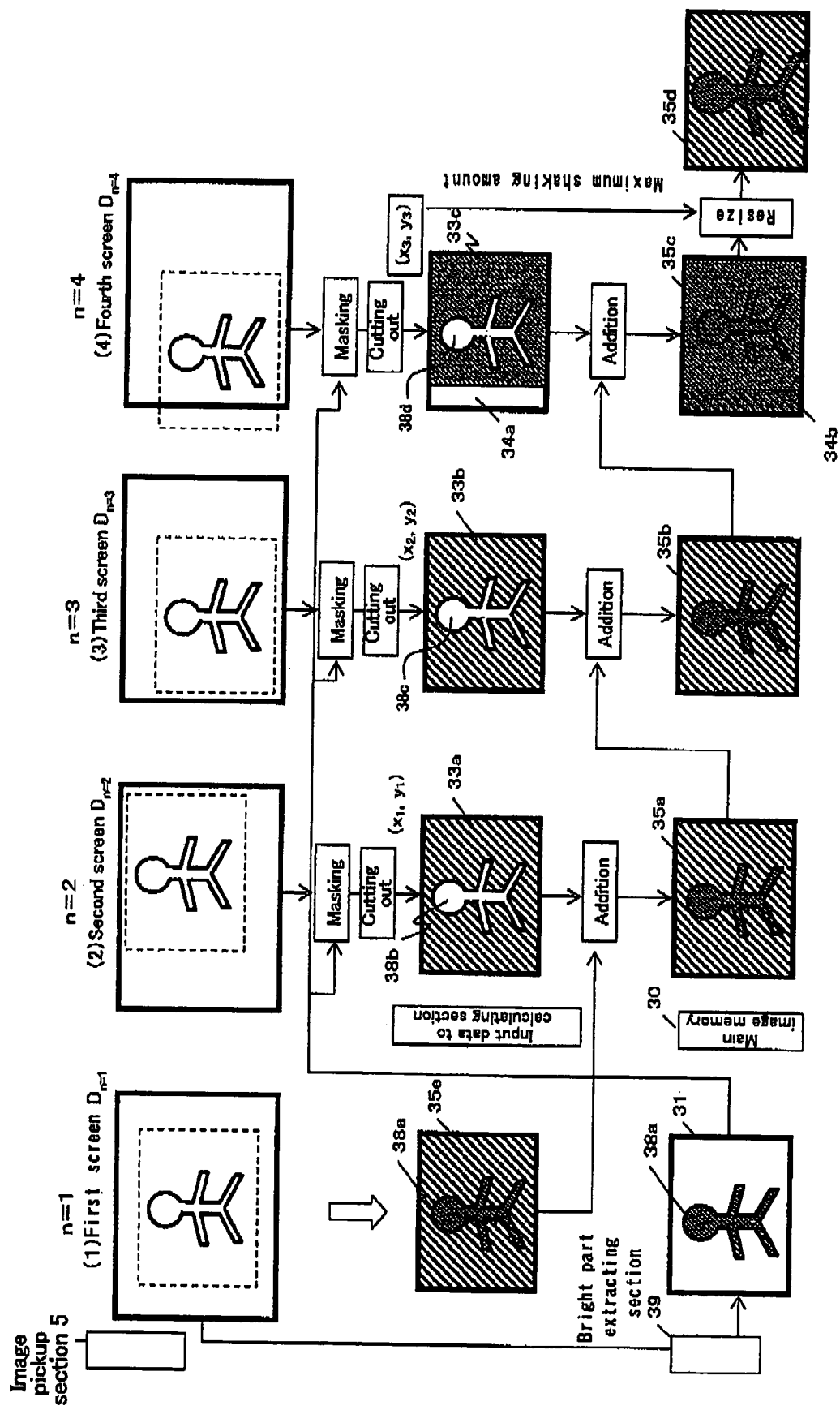
FIG. 4 is a view showing a masking operation according to an embodiment of the present invention.

FIG. 4 shows a masking operation according to an embodiment of the present invention.

Image $D_{n=1}$ indicates an image taken at time of n=1, image $D_{n=2}$ indicates an image taken at time of n=2, image $D_{n=3}$ indicates an image taken at time of n=3, and image $D_{n=4}$ indicates an image taken at time of n=4.

A stroboscope emits a light at the time of n=1. Accordingly, a person shown in image 35e is brighter than a background (e.g., a night scene), for example. Herein, the person shown in the image 35e is defined as a bright part 38a. The bright part extracting section 39 extracts data indicating the bright part 38a from data indicating the image 35e and generates masking data 31 based on the extracted data indicating the bright part.

At the time of n=2, the masking data 31 is cut out of the image data indicating image $D_{n=2}$. Data indicating a corrected image 33a is generated by deleting an image of the bright part 38b and correcting the shaking motion. The data indicating the corrected image 33a is added to the data indicating the image 35e, so as to generate data indicating an integrated image 35a.

At the time of n=3, the masking data 31 is cut out of the image data indicating image $D_{n=3}$. Data indicating a corrected image 33b Is generated by deleting an image of the bright part 38c and correcting the shaking motion. The data indicating the corrected image 33b is added to the data indicating the integrated image 35a, so as to generate an integrated image 35b.

At the time of n=4, the masking data 31 is cut out of the image data indicating image $D_{n=4}$. Data indicating a corrected image 33c is generated by deleting an image of the bright part 38d and correcting the shaking motion. The data indicating the corrected image 33c is added to the data indicating the integrated image 35b, so as to generate data indicating an integrated image 35c.

The data indicating the integrated image 35c is resized so as to generate data indicating an integrated image 35d.

As described above, a bright part such as a person which becomes bright by the light emitted from the stroboscope is taken at the time of n=1, and an image of a region other than the bright part among the image is taken at the time of n=2, 3 and 4. When a picture of a person in a night scene and the like is taken at a slow shutter speed using the stroboscope, an image of a face of the person exposed during a period at the slow shutter speed is overlapped onto an image of the face of the person at the time when the stroboscope emits the light (double exposure) so that the overlapped image is blurred. However, according to the masking operation according to the embodiment of the present invention, the correction of the shaking motion allows that the bright part such as a face of the person Is not subjected to the double exposure. As a result, the bright part can be taken clearly.

4. Change of Frame Rate

Figure 5:
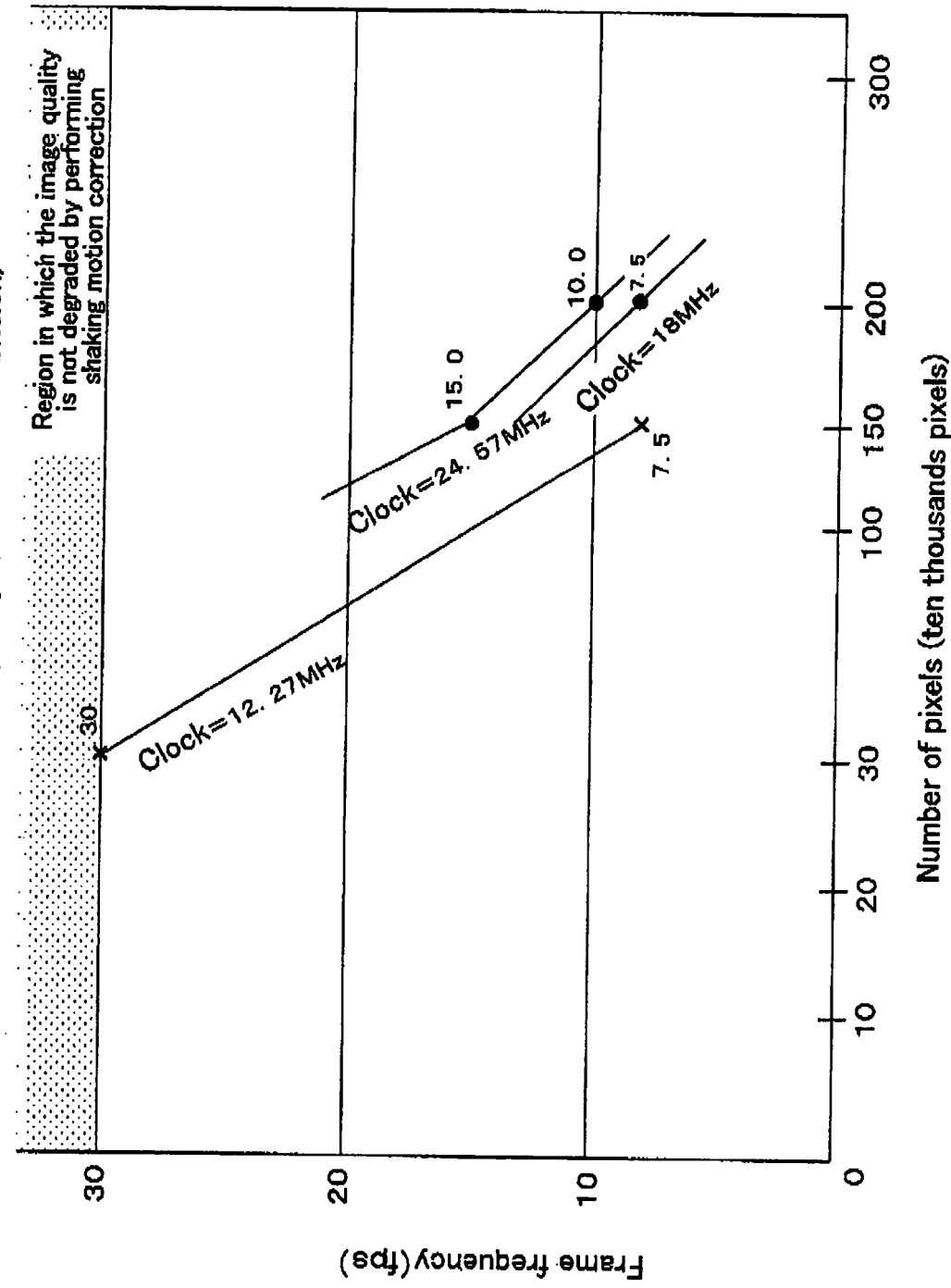
FIG. 5 is a chart showing a relationship between the number of pixels and the frame frequency.

FIG. 5 shows a relationship between the number of pixels and the frame frequency.

When the resolution in the image pickup section 5 (see FIG. 1) is reduced by the resolution changing section 24 (see FIG. 1), the frame rate (fps) can be increased. Further, when the transfer clock speed is increased by the clock control section 27, the processing clock supply section 28 and the transfer clock supply section 32, the frame rate (fps) can be increased.

In an embodiment according to the present invention, it is possible to substantially increase the frame rate by increasing the transfer clock or reducing the resolution at the time when the image is taken for the purpose of the correction of shaking motion, thereby eliminating an afterimage (image degradation) which is particularly caused by an electronic correction of the shaking motion. When a usual image pickup section having 2,000,000 pixels is used and the frame rate is approximately 7.5 fps, the influence of the afterimage is maintained. The frame rate should be higher than or equal to 20 fps. Otherwise, it is difficult to eliminate the afterimage which Is particularly caused by the electronic correction of the shaking motion.

Figure 6:
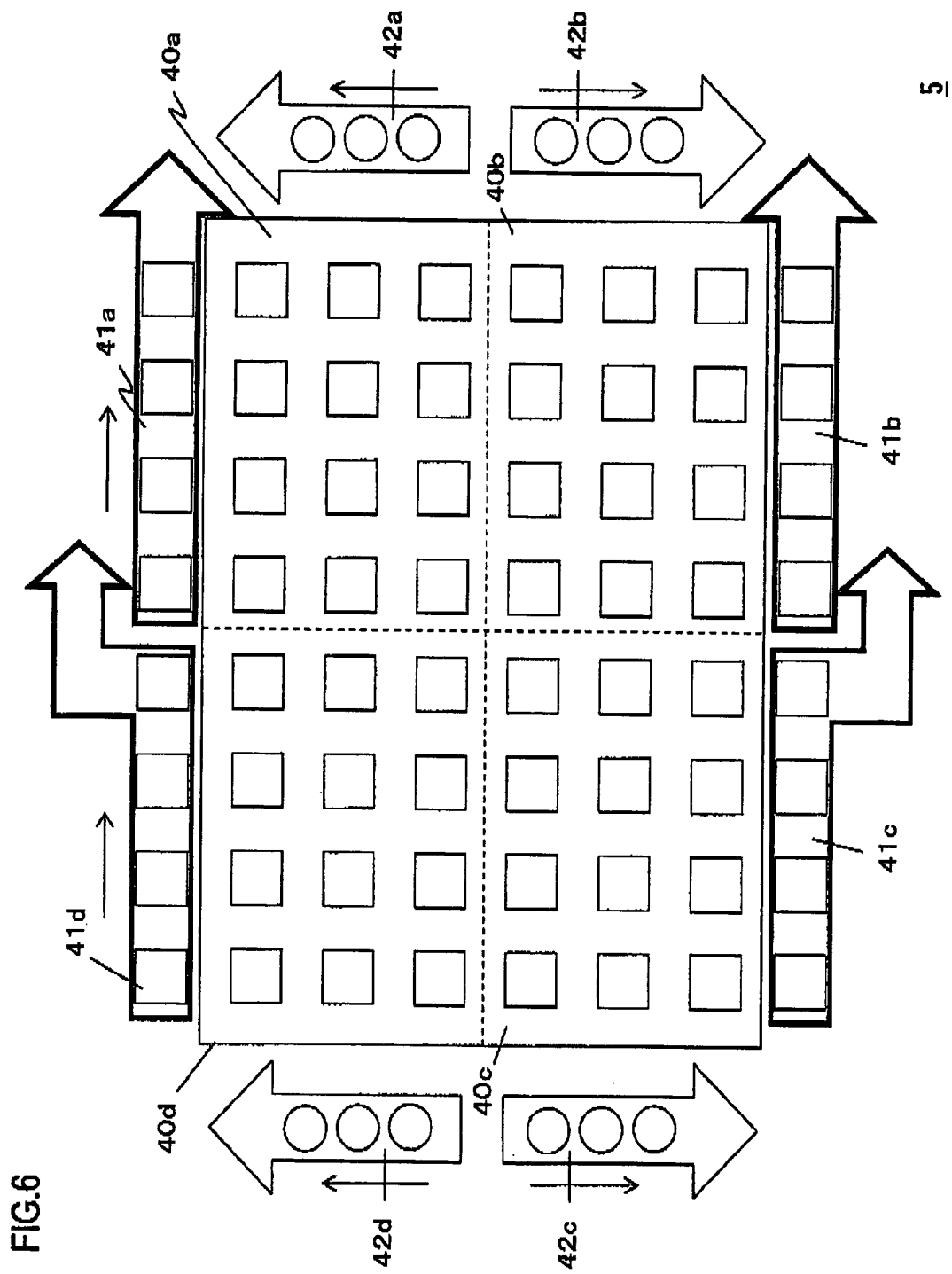
FIG. 6 is a view showing a structure of the image pickup section 5 including a pixel region divided into four parts.

FIG. 6 shows a structure of the image pickup section 5 including a pixel region divided into four parts.

The image pickup section 5 includes a pixel region 40. The pixel region 40 is divided into four pixel regions (i.e., pixel region 40a, pixel region 40b, pixel region 40c and pixel region 40d). The image pickup section 5 further includes a horizontal transfer section divided into four parts (i.e., horizontal transfer section 41a, horizontal transfer section 41b, horizontal, transfer section 41c and horizontal transfer section 41d) and a vertical transfer section divided into four parts (i.e., vertical transfer section 42a, vertical transfer section 42b, vertical transfer section 42c and vertical transfer section 42d). Accordingly, time required for sweeping all pixels out is reduced to be ¼ of its original amount and the frame rate is increased to be fourfold its original amount. In this case, the frame rate is 30 fps under the condition that an image pickup device of a CCD type having 2,100,000 pixels is used and the clock speed is 18 MHz. As a result, it is possible to not observe image degradation due to the correction of the shaking motion. The image pickup section 5 may be divided into two parts in a transverse direction.

Figure 7:
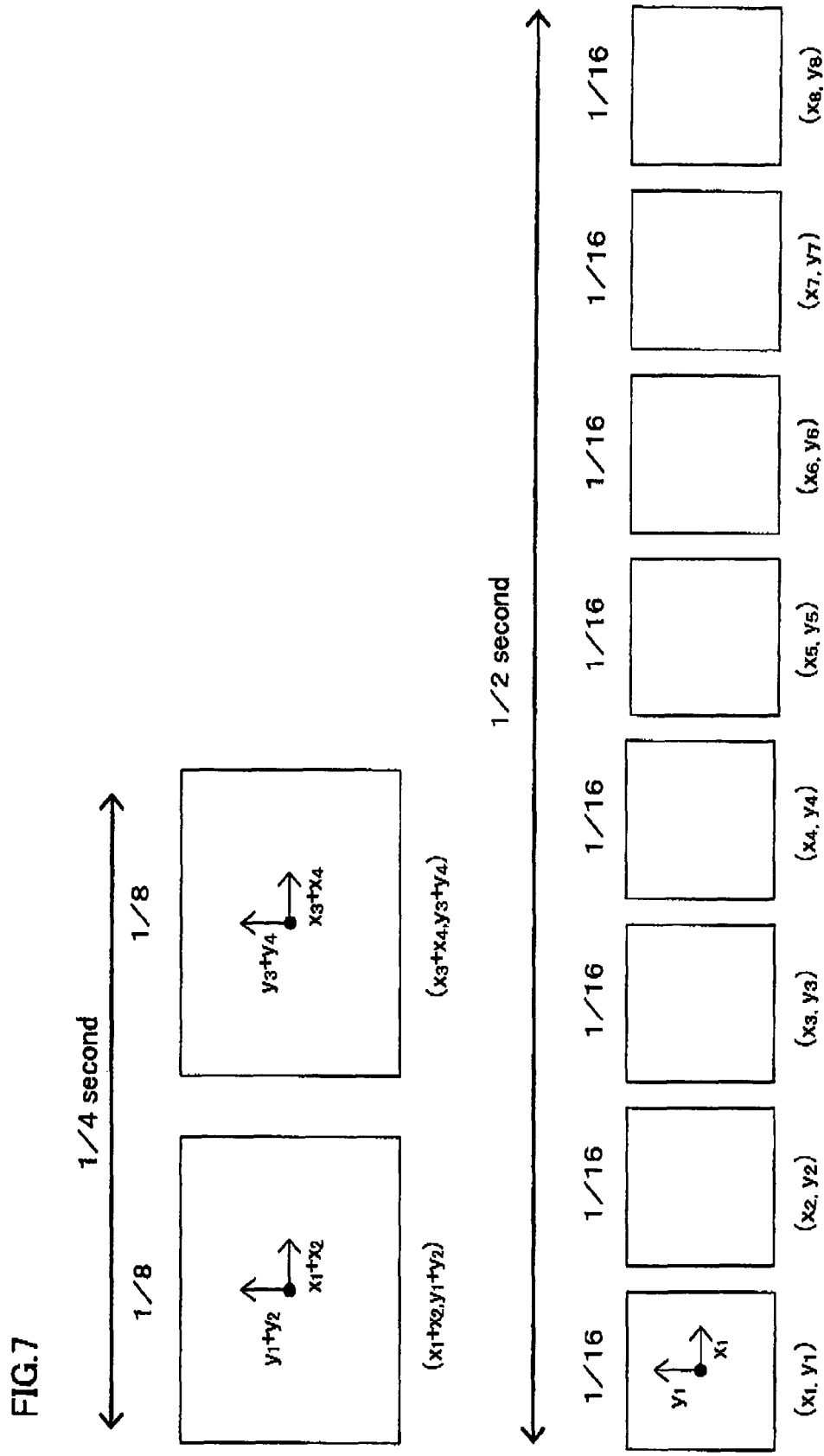
FIG. 7 is a view showing an operation in the case where the frame rate is increased according to an embodiment of the present invention.

FIG. 7 is a diagram showing an operation in the case where the frame rate is increased according to an embodiment of the present invention.

When the exposure time is ¼ second, a frame is obtained every ⅛ second. In this case, an amount of the shaking motion in the x-direction is represented by So $(x_1+x_{i+1})dt \approx ((x_1+x_2)+(x_3+x_4))/2$.

When the exposure time is ½ second, a frame is obtained every ¹⁄₁₆ second by increasing the frame rate. In this case, the amount of the shaking motion in the x-direction is represented by $(x_1+x_2+x_3+x_4+x_5+x_6+x_7+x_8)/8 \approx ((x_1+x_2+x_3+x_4)/2+(x_5+x_6+x_7+x_8)/2)/4$.

When the exposure time is long, the frame rate is increased to obtain a large number of frames. As a result, it is possible to detect the amount of the shaking motion in detail, and it is possible to decrease image degradation due to the correction of the shaking motion.

Thus, according to the image pickup apparatus of the present invention, it is possible to correct the shaking motion over information indicating a plurality of frames and to generate information indicating a static image. Therefore, it is possible to obtain a static image subjected to the correction of the shaking motion.

As described above, in the chapters titled (1. Image pickup apparatus) to (4. Change of frame rate), an exemplary embodiment of the present invention is described with reference to FIGS. 1 to 7.

In the embodiment shown in FIGS. 1 to 7, for example, the shaking motion detecting section 15 corresponds to "a shaking motion detecting section for detecting an amount of the shaking motion between a plurality of frames representing the static image which has been taken", the shaking motion correcting section 9 corresponds to "a shaking motion correcting section for correcting a plurality of frame information indicating the plurality of frames in accordance with the detected amount of the shaking motion", the main image memory 30 corresponds to "a storage section for storing the plurality of frame information subjected to the correction of the shaking motion", and the calculating section 29 corresponds to "an information generating section for generating static image information indicating a static image based on the plurality of frame information stored in the storage section".

However, the image pickup apparatus of the present invention is not limited to the embodiment shown in FIGS. 1 to 7. Each of the components included in the image pickup apparatus can have an arbitrary configuration as long as the image pickup apparatus has each function of the "the shaking motion detecting section for detecting an amount of the shaking motion between a plurality of frames representing a static image which has been taken", "the shaking motion correcting section for correcting a plurality of frame information indicating the plurality of frames in accordance with the detected amount of the shaking motion", "the storage section for storing the plurality of frame information subjected to the correction of the shaking motion", and "the information generating section for generating static image information indicating a static image based on the plurality of frame information stored in the storage section".

5. Image Pickup Method 1

Figure 8:
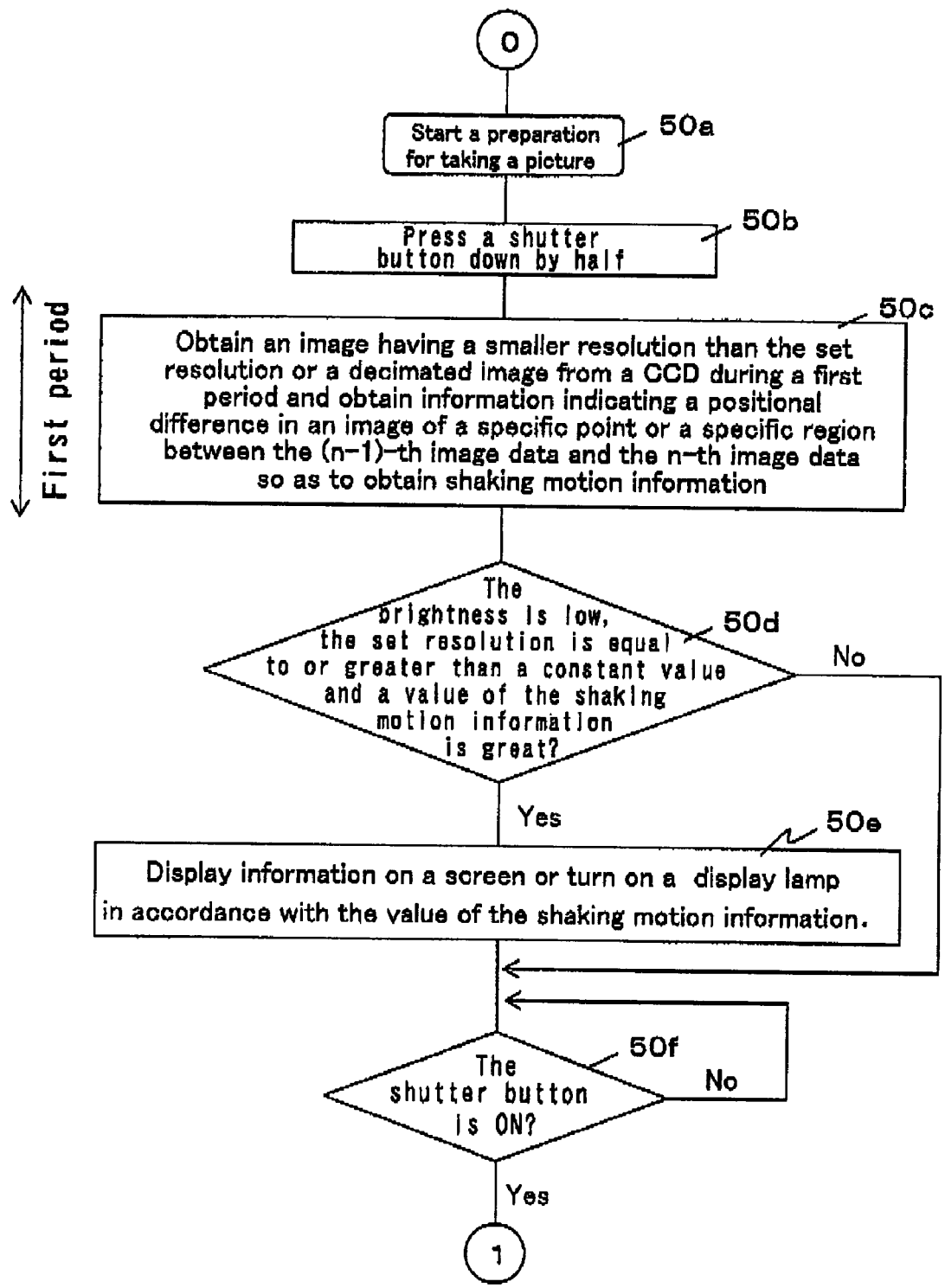
FIG. 8 is a flowchart showing a procedure of the image pickup process (steps 50a to 50f) according to an embodiment of the present invention.

FIG. 8 shows a procedure of an image pickup process (step 50*a* to Step 50*f*) according to an embodiment of the present invention.

Figure 9:
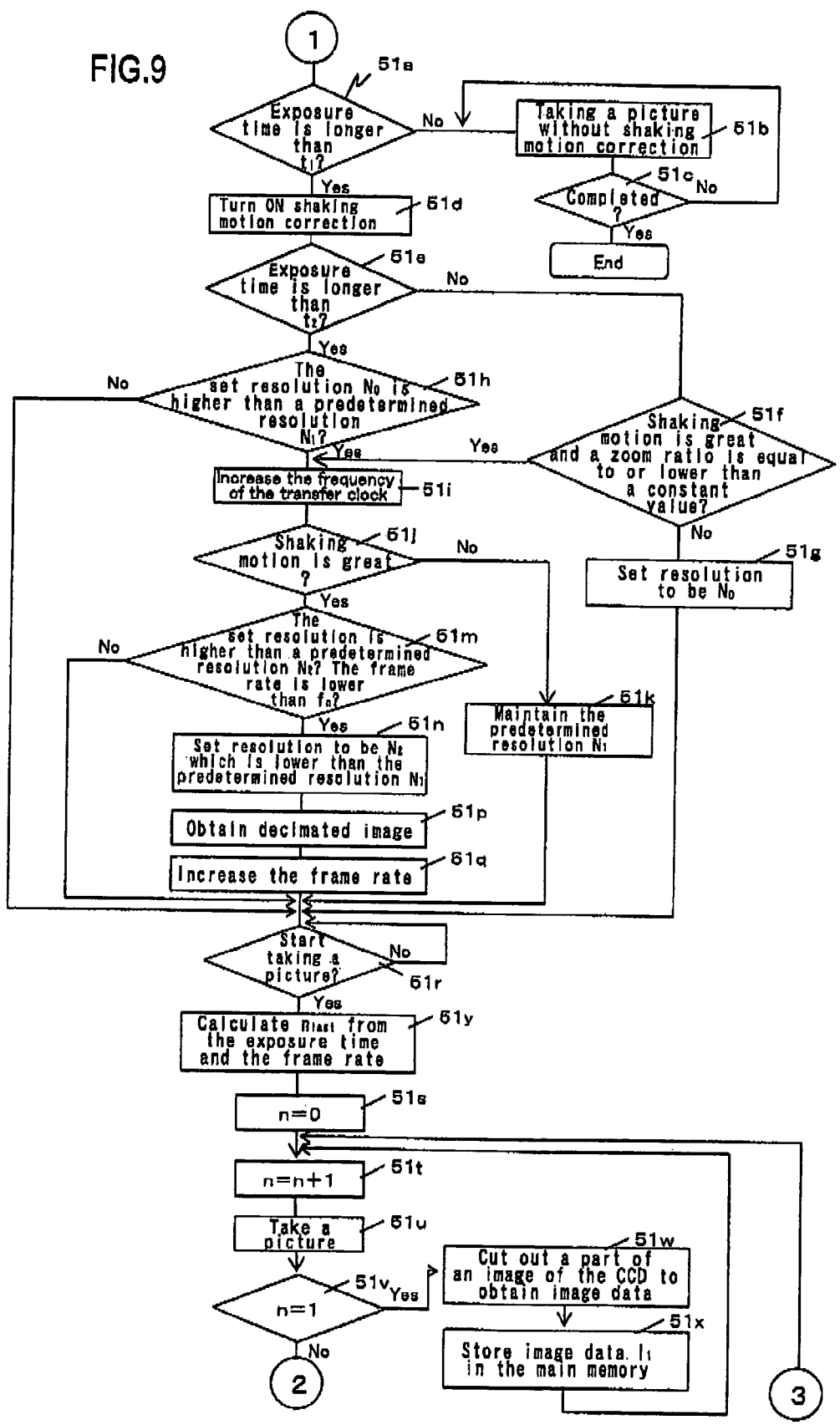
FIG. 9 is a flowchart showing a procedure of the image pickup process (steps 51a to 51f) according to an embodiment of the present invention.

FIG. 9 shows a procedure of an image pickup process (step 51*a* to Step 51*y*) according to an embodiment of the present invention.

Figure 10:
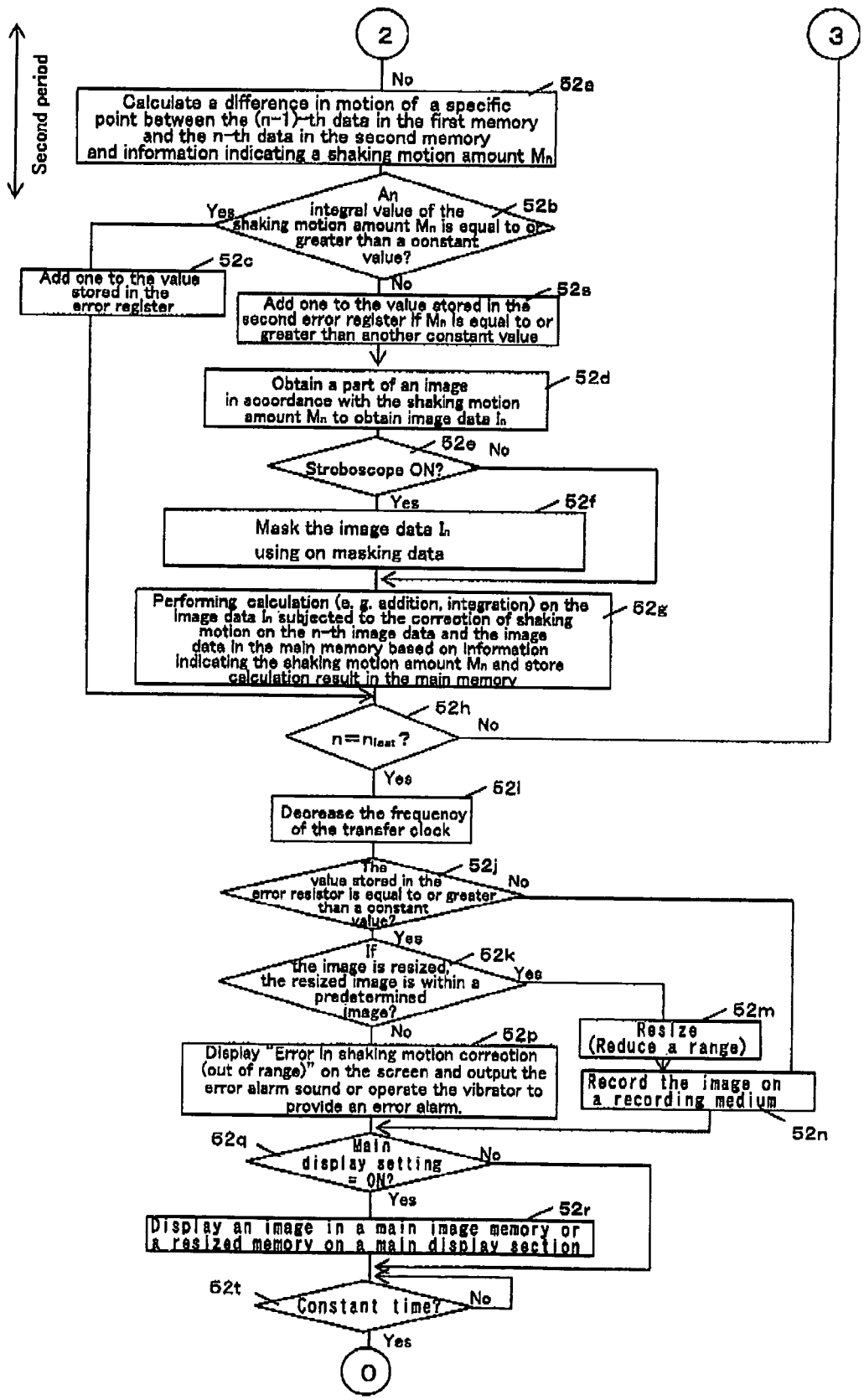
FIG. 10 is a flowchart showing a procedure of the image pickup process (steps 52a to 52f) according to an embodiment of the present invention.

FIG. 10 shows a procedure of an image pickup process (step 52*a* to Step 52*t*) according to an embodiment of the present invention.

With reference to FIG. 1 and FIGS. 8 to 10, the procedure of the image pickup process according to an embodiment of the present invention will be described below step by step.

With reference to FIG. 8, steps 50*a* to 50*f* will be described below.

Step 50*a*: An operator prepares to take a still picture.

Step 50*b*: When the operator presses the shutter button 25 halfway down, the CPU 26 provides an instruction to the clock control section 27, such that the processing clock supply section 28 starts the operation of a clock or increases a clock speed in the calculating section and the like. When the processing clock supply, section 28 starts the operation of the clock or increases the clock speed in the calculating section 29 and the like, the process proceeds to step 50*c*.

Step 50*c*: The image pickup section 5 obtains an image having a smaller resolution than a set resolution or a decimated image. Information indicating a positional difference in a specific point or a specific region between the (n−1)-th image and the n-th image is generated based on the data indicating the (n−1)-th image and the data indicating the n-th image, so as to obtain shaking motion information (an amount of shaking motion).

Step 50*d*: It Is determined whether or not the shaking motion information (the amount of shaking motion) its larger than a predetermined value under the condition that the brightness in the place where the still picture is to be taken is low and the set resolution is greater than or equal to a constant value. If the shaking motion information is larger than the predetermined value (Yes), then the process proceeds to step 50*e*. If the shaking motion information is smaller than or equal to the predetermined value (No), then the process proceeds to step 50*f*.

Step 50*e*: A warning of "Beware of shaking motion." is displayed on the display section 12 in accordance with the value of the shaking motion information.

Step 50*f*: The operator determines whether or not he/she presses the shutter button 25 down. If the operator presses the shutter button 25 down (Yes), then the process proceeds to step 51*a* (see FIG. 9). If the operator does not press the shutter button 25 down (No), the process of the step 50*f* is repeated.

With reference to FIG. 9, steps 51*a* to 51*y* will be described below.

Step 51*a*: It is determined whether or not a shutter speed (exposure time) is longer than $t_1$. For example, the CPU 26 determines whether or not the shutter speed (the exposure time) is longer than $t_1$.

If the shutter speed (the exposure time) is shorter than or equal to $t_1$ under the condition that the zoom ratio of the zoom section 6 is smaller than or equal to a constant value (No), then the process proceeds to step 51*b*. If the shutter speed (the exposure time) is longer than $t_1$ (Yes), then the process proceeds to step 51*d*.

Step 51*b*: A picture is taken without correcting shaking motion (without correcting shaking motion).

Step 51*c*: Taking a picture is completed and the process is terminated.

Step 51*d*: The shaking motion correction priority switch is turned ON.

Step 51*e*: It is determined whether or not the shutter speed (the exposure time) is longer than $t_2$.

If the shutter speed (the exposure time) is shorter than or equal to $t_2$ (No), then the process proceeds to step 51*f*. If the shutter speed (the exposure time) is longer than $t_2$ (Yes), the process proceeds to step 51*h*.

Step 51*f*: It is determined whether or not the shaking motion occurs radically, and whether or not the zoom ratio is higher than or equal to a constant value.

If the shaking motion does not occur radically and the zoom ratio is higher than the constant value (No), then the process proceeds to step 51*g*. If the shaking motion occurs radically and the zoom ratio is lower than or equal to the constant value (Yes), then the process proceeds to step 51*i*.

Step 51*g*: The process proceeds to a routine for correcting the shaking motion (step 51*r*) while a resolution is set to be a preset resolution $N_0$.

Step 51*h*: It is determined whether or not the set resolution $N_0$ is higher than a predetermined resolution $N_1$.

If the set resolution $N_0$ is lower than or equal to the predetermined resolution $N_1$ (No), then the process proceeds to the step 51*r*. If the set resolution $N_0$ is higher than the predetermined resolution $N_1$ (Yes), then the process proceeds to step 51*i*.

Step 51*i*: The speed of the transfer clock of the pixel transfer section 23 is increased by the clock control section 27. Thus, the frame rate is increased.

Step 51*j*: it is determined whether or not the shaking motion occurs radically.

If the shaking motion does not occur radically and the zoom ratio is lower than or equal to the constant value, that is, the shaking motion is very small (No), then the process proceeds to step 51*k*. If the shaking motion occurs radically or the zoom ratio is higher than the constant value, that is, the shaking motion occurs radically to some extent (Yes), then the process proceeds to step 51*m*.

Step 51*k*: The process proceeds to step 51*r* while the resolution is set to be the predetermined resolution $N_1$.

Step 51*m*: It is determined whether or not the set resolution is higher than a predetermined resolution $N_2$, or it is determined whether or not the frame rate is lower than a predetermined value fn.

If the set resolution is lower than or equal to the predetermined resolution $N_2$, or the frame rate is higher than or equal to the predetermined value fn (No), then the process proceeds to step 51*r*.

If the set resolution is higher than the predetermined resolution $N_2$, or the frame rate is lower than the predetermined value fn (Yes), then the process proceeds to step 51*n*.

Step 51*n*: The process proceeds to step 51*p* in order to set the resolution to be the resolution $N_2$ which is lower than the predetermined resolution $N_1$.

Step 51*p*: By the resolution changing section 24 and the decimation control section 25*a*, a pixel output from the image pickup section 5 is decimated or information indicating a plurality of pixels in the in-plane direction is added to each other to generate information indicating one pixel, thereby decreasing the number of pixels (i.e., decreasing the resolution) (the resolution is set to be the resolution $N_2$).

Step 51*q*: As a result of setting the resolution to be the resolution $N_2$ which is lower than the predetermined resolution $N_1$, a value of the highest speed of the frame rate is increased. The frame rate is increased.

Step 51*r*: It is determined whether or not an input of an image to the routine for correcting the shaking motion is started in order to take a plurality of frames (images) into the image pickup apparatus 100. If the input of the image is started (Yes), the process proceeds to step 51*y*.

Step 51*y*: The total number of frames $n_{last}$ required for a dividing exposure is calculated based on exposure time (i.e., a shutter time), a diaphragm value and a frame rate. When the shaking motion occurs radically, the shutter time is shortened for each still picture.

Step 51*s*: n is set be 0 (n=0).

Step 51*t*: n is incremented by one (n=n+1).

Step 51*u*: The n-th image is taken, and the n-th static image from the image pickup section 5 is stored into the sub-memory 8 (i.e., n-th static image data is obtained).

Step 51*v*: It is determined whether or not the static image data is the 1st static image data.

If the static image data is the 1st static image data (Yes), then the process proceeds to step 51*w*. If the static image data is not the 1st static image data (No), then the process proceeds to step 52*a* (see FIG. 10).

Step 51*w*: A part of the image of the image pickup section 5 is cut out to obtain image data $I_1$.

Step 51*x*: The image data $I_1$ is stored in the main image memory 30.

With reference to FIG. 10, steps 52*a* to 52*t* will be described below.

Step 52*a*: The motion of a specific point between the first image data and the second image data is calculated by the shaking motion detecting section 15 so as to obtain a shaking motion amount Mn (see FIG. 2).

When image data indicating a first image $D_1$, taken at time of $t=t_1$, is stored in the first memory 16 included in the shaking motion detecting section 15 and image data indicating a second image $D_2$, taken at time of $t=t_2$, is stored in the second memory 17 included in the shaking motion detecting section 15, the shaking motion detecting section 15 detects a shaking motion amount $M_1$ (e.g., a motion vector $(x_1, y_1)$) between the image $D_1$ and the image $D_2$ based on the image data indicating two images (i.e., the image data indicating the image $D_1$ and the image data indicating the image $D_2$) and outputs data indicating the shaking motion amount.

Step 52*b*: It is determined whether or not the integral value of the shaking motion amount Mn is greater than or equal to a constant value.

If the integral value of the shaking motion amount Mn is greater than or equal to the constant value (Yes), then it is determined that the taken image gets out of a specific region and the process proceeds to step 52*c*. If the integral value of the shaking motion amount Mn is smaller than the constant value (No), then the process proceeds to step 52*s*.

Step 52*c*: A value of "1" (one) is added to the value stored in the error register. The n-th image is not stored in the main image memory 30, and the process proceeds to step 52*h*.

Step 52*s*: It is determined whether or not the integral value of the shaking motion amount Mn is greater than or equal to another constant value. If the integral value of the shaking motion amount Mn is greater than or equal to another constant value, then a value of "1" (one) is added to the value stored in the second error register.

Step 52*d*: Image data $I_n$, which is cut out from the image data output from the image pickup section 5 in the longitudinal direction in accordance with the shaking motion amount Mn, is stored in the sub-image memory 8.

Step 52*e*: It is determined whether or not the stroboscope is turned ON. If the stroboscope is turned ON (Yes), then the process proceeds to step 52*f*. If the stroboscope is not turned ON (No), then the process proceeds to step 52*g*.

Step 52*f*: The image data $I_n$ is previously masked by the masking section 20 (see FIGS. 4 and 3. Masking operation).

Step 52*g*: The image data $I_n$, subjected to the correction of the shaking motion in the lateral direction and the correction of the shaking motion in the longitudinal direction, is obtained from the shaking motion correcting section 9.

For example, the image data $I_n$ is sent to the calculating section 29 and a calculation (e.g., addition, integration) is performed on the image data stored in the main image memory 30 and the image data $I_n$, and the calculation result is stored back into the main image memory 30.

Step 52*h*: The shaking motion correcting control section 21 determines whether or not n is equal to $n_{last}$ (i.e., $n=n_{last}$ is satisfied), where $n_{last}$ denotes a last value for n.

If $n=n_{last}$ is satisfied (Yes), then the process proceeds to step 52*i*. If $n=n_{last}$ is not satisfied (No), then the process proceeds to step 51*t* (see FIG. 9) in order to take another image data.

Step 52*i*: The frequency of the transfer clock of the image pickup section 5 is lowered by the clock control section 27. Alternatively, the transfer clock of the image pickup section 5 may be stopped in order to reduce power consumption.

Step 52*j*: It is determined whether or not the value stored in the second error register is greater than or equal to a constant value.

If the value stored in the second error register is smaller than the constant value (No), then the process proceeds to step 52*n*. If the value stored in the second error register is greater than or equal to the constant value (Yes), then the process proceeds to step 52*k*.

Step 52*k*: It is determined whether or not a lacking part can be eliminated (whether or not the range of the lacking part is within the range in which the lacking part can be eliminated) by resizing an integrated image.

For example, a lacking part 34*a* is generated in the corrected image 33*c* (see FIG. 4). In this case, a lacking part 34*b* is also generated in the integrated image 35*c*. Accordingly, it is necessary to resize the integrated image 35*c* in order to eliminate the lacking part 34*b*. In this case, it is determined whether or not the lacking part 34*b* can be eliminated (whether or not the range of the lacking part 34*b* is within the range in which the lacking part 34*b* can be eliminated) by resizing the integrated image 35*c*.

If the lacking part can be eliminated (Yes), then the process proceeds to step 52*m*. If the lacking part cannot be eliminated (No), then the process proceeds to step 52*p*.

Step 52*m*: The lacking part 34*b* is eliminated by resizing the integrated image 35*c*, so as to obtain an integrated image 35*d* having no lacking part (see FIG. 4).

Step 52*n*: The data indicating the integrated image 35*d* is recorded on the recording medium 14.

Step 52*p*: Even if the correction of the shaking motion is performed, the lacking part cannot be eliminated. Therefore, an operator is notified of the failure to correct the shaking motion. For example, the statement having the meaning of "Error In the shaking motion correction (out of range)" is displayed on the display section 12 (see FIG. 1). Further, an error warning sound is output from the speaker 37. Further, the vibrator 36 is vibrated.

Step 52*q*: It is determined whether or not the main display setting is turned ON.

If the main display setting is turned ON (Yes), then the process proceeds to step 52*r*. If the main display setting is not turned ON (No), then the process proceeds to step 52*t*.

Step 52*r*: The integrated image subjected to the correction of the shaking motion, which is stored in the main image memory 30, or the resized image is displayed on the display section 12.

Step 52*t*: The image subjected to the correction of the shaking motion is recorded on the recording medium 14. When another image subjected to the correction of the shaking motion is to be taken after a predetermined time passes, the process returns back to the initial step 50*a* (see FIG. 8).

Thus, according to the image pickup method of the present invention, information indicating a plurality of frames can be subjected to the correction of the shaking motion and information indicating a static image can be generated. As a result, it is possible to obtain one static image subjected to the correction of the shaking motion.

As described above, in the chapter titled (5. Image pickup method 1), the exemplary embodiment of the present invention has been described with reference to FIG. 1 and FIGS. 8 to 10.

For example, in the embodiment shown in FIGS. 8 to 10, step 52*a* corresponds to "the step of detecting an amount of shaking motion between a plurality of frames representing a static image which is taken", steps 52*b* to 52*g* correspond to "the step of correcting a plurality of frame information indicating the plurality of frames in accordance with the detected amount of the shaking motion", step 52*g* corresponds to "the step of storing the plurality of frame information subjected to the correction of the shaking motion", and step 52*g* or step 52*m* corresponds to "the step of generating static image information indicating a static image based on the plurality of frame information stored in the storage section".

However, the image pickup method of the present invention is not limited to the embodiment shown in FIGS. 8 to 10. Each of the steps included In the image pickup method can be processed in any arbitrary manner as long as the image pickup method has the functions of "detecting an amount of shaking motion between a plurality of frames representing a static image which is taken", "correcting a plurality of frame information indicating the plurality of frames in accordance with the detected amount of the shaking motion", "storing the plurality of frame information subjected to the correction of the shaking motion", and "generating static image information indicating a static image based on the plurality of frame information stored in the storage section".

For example, as described with reference to FIGS. 8 to 10, the calculating section 29 sequentially calculates each of a plurality of image data (frame information) stored in the main image memory 30, thereby generating static image information. Alternatively, the calculating section 29 may simultaneously calculate a plurality of image data (frame information) stored in the main image memory 30, thereby generating the static image information.

6. Image Pickup Method 1 (Sequential Calculation)

Figure 11:
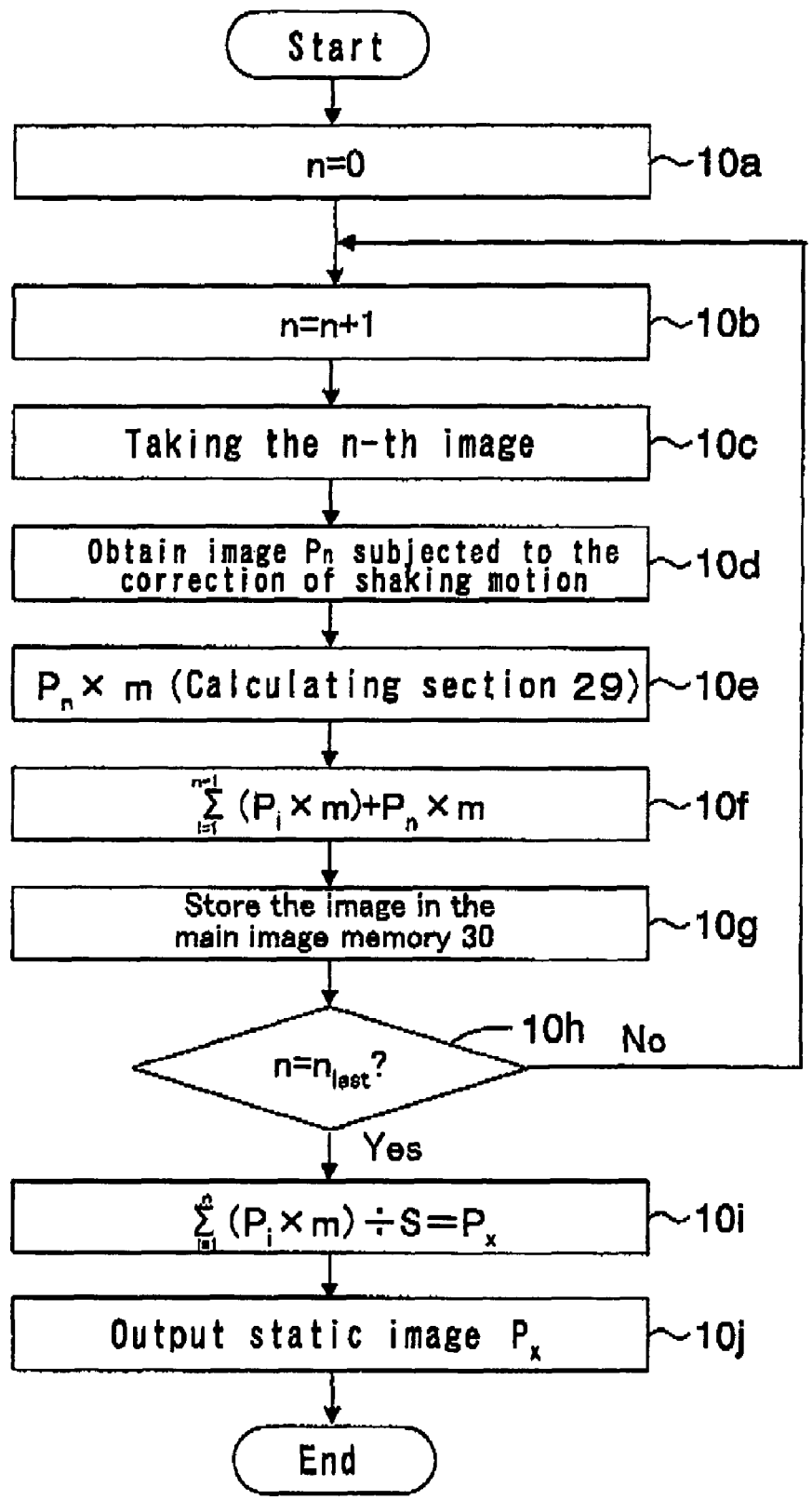
FIG. 11 is a flowchart showing a procedure of the sequential calculation process according to an embodiment of the present invention.

FIG. 11 shows a procedure of a sequential calculation process according to an embodiment of the present invention. In the procedure of the sequential calculation process, each of a plurality of image data (frame information) is sequentially calculated to generate static image information.

With reference to FIGS. 1 and 11, the procedure of the sequential calculation process after the preparation of taking a picture is completed (the process starting from step 51*s* in FIG. 9) will be described below step by step.

Step 10*a*: n is set to be 0 (n=0).

Step 10*b*: n is incremented by one (n=n+1).

Step 10*c*: The n-th image is taken, and the n-th image is stored into the sub-memory 8.

Step 10d: The n-th image is subjected to the correction of the shaking motion so as to obtain an image $P_n$ which has been subjected to the correction of the shaking motion.

Step 10e: The calculating section 29 multiplies the data indicating the image $P_n$ subjected to the correction of the shaking motion by m ($P_n \times m$).

Step 10f: The calculating section 29 adds the data indicating the image $P_n$ multiplied by m to the image data stored in the main image memory 30 ($\Sigma^{n-1}_{i=1} (P_i \times m) + (P_n \times m)$).

Step 10g: The result of the addition is stored in the main image memory 30.

Step 10h: It is determined whether or not n is equal to $n_{last}$ (n=$n_{last}$ is satisfied), where $n_{last}$ denotes the last value for n.

If n=$n_{last}$ is satisfied (Yes), then the process proceeds to step 10i. If n=$n_{last}$ is not satisfied (No), then the process proceeds to step 10b in order to take another image data.

Step 10i: The sub-calculating section 29a multiples, by 1/s, the image data multiplied by m and added sequentially, so as to generate image data $P_x$ indicating a static image ($P_x = (\Sigma^n_{i=1} (P_i \times m))/s$).

Step 10j: The generated image data $P_x$ is output to the recoding section 13.

After the generated image data $P_x$ is output to the recoding section 13, the process is completed.

Thus, according to the procedure of the sequential calculation process, each of the image data (frame information) is sequentially calculated to generate static image information. Therefore, it is possible to shorten the time required for generating the static image information.

Further, the calculating section 29 adds the data indicating the pixel $P_n$ multiplied by m to the image data stored in the main image memory 30 and the sub-calculating section 29a multiplies, by 1/s, the image data multiplied by m and added sequentially so as to generate image data $P_x$ indicating a static image. By setting the value of m and the value s to arbitrary values, it is possible to obtain a single still picture having a desired brightness.

7. Image Pickup Method 1 (Simultaneous Calculation)

Figure 12:
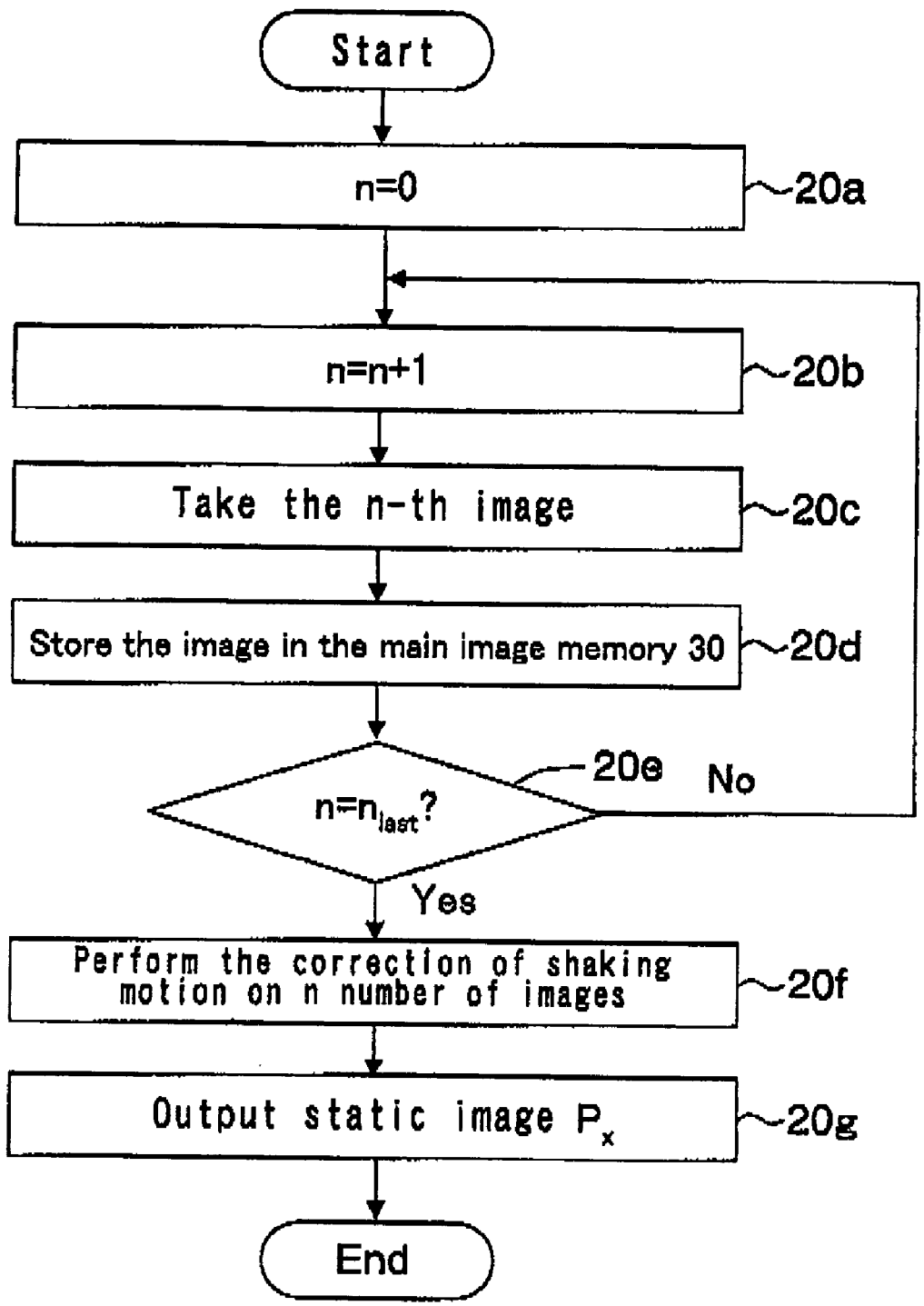
FIG. 12 is a flowchart showing a procedure of the simultaneous calculation process according to an embodiment of the present invention.

FIG. 12 shows a procedure of a simultaneous calculation process according to an embodiment of the present invention. In the procedure of the simultaneous calculation process, a plurality of image data (frame information) are simultaneously calculated, thereby generating static image information.

With reference to FIGS. 1 and 12, the procedure of the simultaneous calculation process after a preparation of taking a picture is completed (the process starting from step 51s in FIG. 9) will be described below step by step.

Step 20a: n is set to be 0 (n=0):

Step 20b: n is incremented by one (n=n+1).

Step 20c: The n-th image is taken.

Step 20d: The data indicating the n-th image is stored in the main image memory 30.

Step 24e: The calculating section 29 determines whether or not n is equal to $n_{last}$ (n=$n_{last}$ is satisfied), where $n_{last}$ denotes the last value for n.

If n=$n_{last}$ is satisfied (Yes), then the process proceeds to step 20f. If n=$n_{last}$ is not satisfied (No), the process proceeds to the step 20b in order to take another image data.

Step 20f: The n number of images are subjected to the correction of the shaking motion. The respective pixels of the n number of images subject to the correction of the shaking motion are integrated so as to generate image data $P_x$ indicating one static image.

Step 20g: The generated image data $P_x$ is output to the recording section 13.

After the generated image data $P_x$ is output to the recording section 13, the process is completed.

Thus, according to the procedure of simultaneous calculation process, a plurality of image data (frame information) are simultaneously calculated to generate static image information. Therefore, it is possible to reduce the load of the calculating section 29.

As described in the chapter titled (6. Image pickup method 1 (sequential calculation)), the image data can be appropriately multiplied by m and 1/s by the sub-calculating section 29a. Accordingly, it is possible to obtain a single still picture having a desired brightness.

8. Image Pickup Method 2

Figure 13:
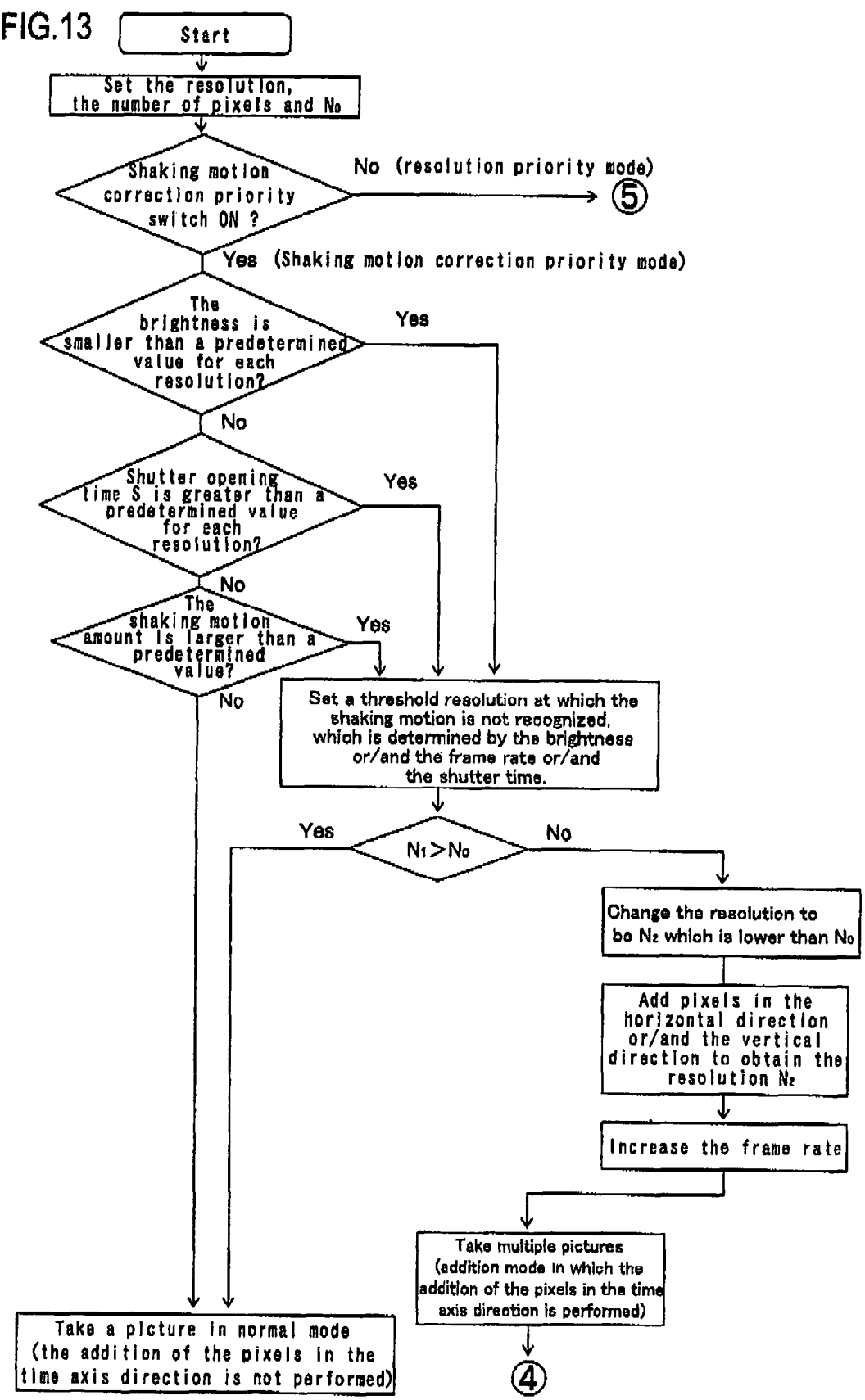
FIG. 13 is a flowchart showing a procedure of a process for correcting the shaking motion by integrating a plurality of images (divided images) in accordance with a shutter speed (exposure time) and a brightness in the place where a picture is to be taken.

FIG. 13 shows a procedure of a process for correcting the shaking motion by integrating a plurality of images (divided images) in accordance with a shutter speed (exposure time) and a brightness in the place where a picture is to be taken.

The procedure of this process will be described below step by step.

Step 99a: The resolution, the number of pixels and the number of divided images are set, respectively.

Step 99b: It is determined whether or not the shaking motion correction priority switch is turned ON.

If the shaking motion correction priority switch is not turned ON (No: resolution priority mode), then the process proceeds to step 80C (see FIG. 19 described later), for example. If the shaking motion correction priority switch is turned ON (Yes: shaking motion correction priority mode), then the process proceeds to step 99c.

Step 99c: It is determined whether or not a brightness in the place where a picture is to be taken is smaller than a predetermined value defined in accordance with a resolution.

If the brightness is smaller than the predetermined value (Yes), then the process proceeds to step 99f. If the brightness is greater than or equal to the predetermined value (No), then the process proceeds to step 99d.

Step 99d: It is determined whether or not a shutter opening time (exposure time) S is greater than a predetermined value defined in accordance with the resolution.

If the shutter opening time S is greater than the predetermined value (Yes), then the process proceeds to step 99f. If the shutter opening time S is smaller than or equal to the predetermined value (No), then the process proceeds to step 99e.

Step 99e: It is determined whether or not the amount of shaking motion is larger than a predetermined value.

If the amount of shaking motion is larger than the predetermined value (Yes), then the process proceeds to step 99f. If the amount of shaking motion is smaller than or equal to the predetermined value (No), then an normal process for taking a picture (a process for taking a picture without adding pixels in the time axis direction) is performed (step 99m).

Step 99f: A resolution (a threshold resolution) $N_1$ at which the shaking motion is not conspicuous is set in accordance with at least one of the brightness in the place where a picture is to be taken, the shutter opening time (exposure time) and the frame rate.

After the resolution is set, the process proceeds to step 99g.

Step 99g: It is determined whether or not the resolution $N_1$ is greater than an initial resolution $N_0$.

If the resolution $N_1$ is greater than the initial resolution $N_0$ (Yes), then a normal process for taking a picture (a process for taking a picture without adding pixels in the time axis direction) is performed (step 99m). If the resolution $N_1$ is smaller than or equal to the initial resolution $N_0$, then the process proceeds to step 99h.

Step 99h: The resolution $N_1$ is changed to a resolution $N_2$ which is smaller than the initial resolution $N_0$.

Step 99i: The resolution is set to be $N_2$ by performing at least one of adding pixels in a horizontal direction (a horizontal addition process) and adding pixels in a vertical direction (a vertical addition process). The details of the horizontal addition process and the vertical addition process will be described later.

Step 99j: The frame rate is increased.

Step 99k: Multiple exposure is performed in an overlapped manner (time axis direction, a pixel addition mode). Next, the process proceeds to step 51y (see FIG. 9), for example.

9. Change of Resolution

Figure 14:
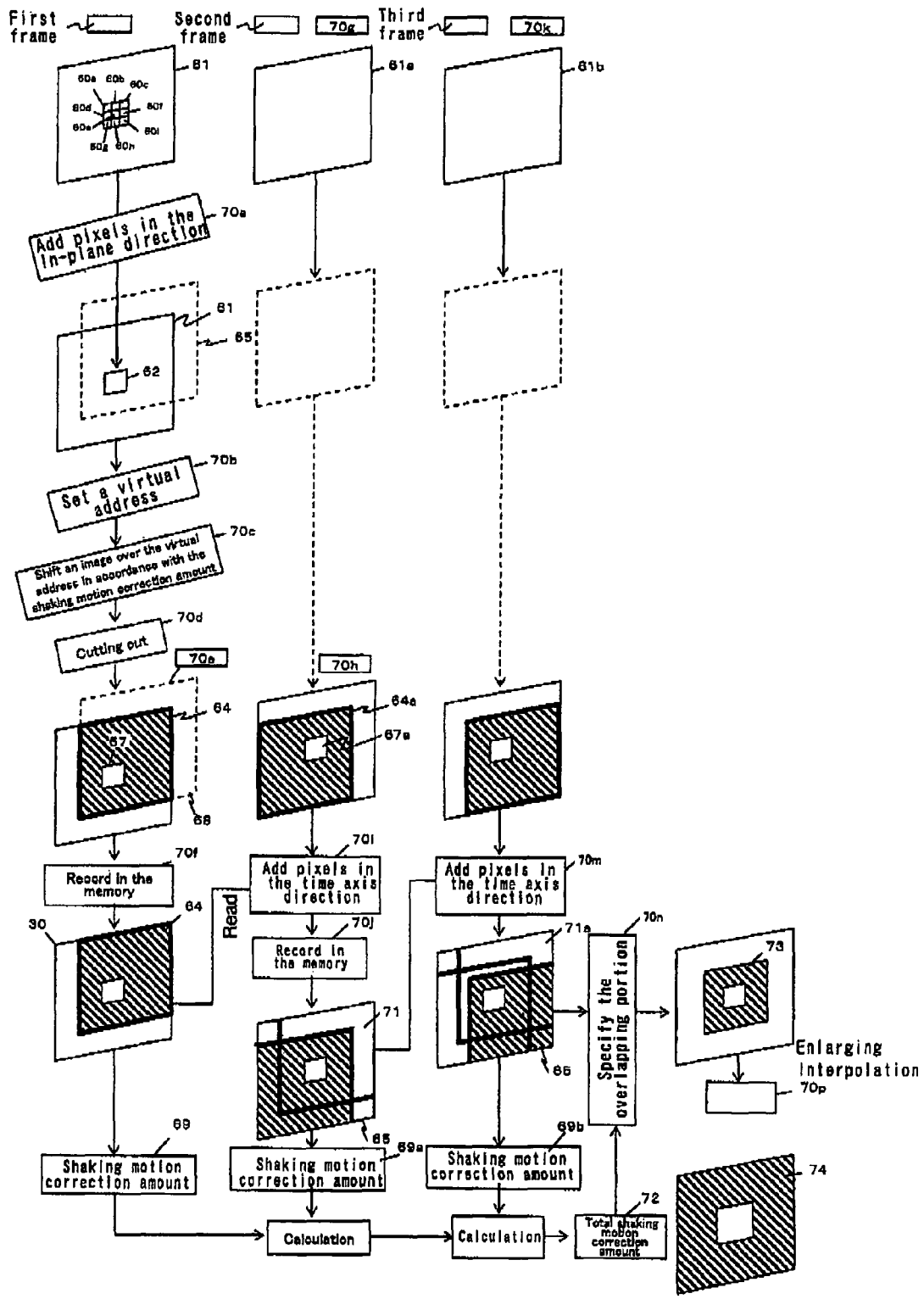
FIG. 14 is a flowchart showing a procedure of a process for changing a resolution by adding pixels in an in-plane direction and adding pixels in the time axis direction.

FIG. 14 shows a procedure of a process for changing a resolution by adding pixels in the in-plane direction and adding pixels in the time axis direction.

With reference to FIG. 14, the procedure of the process for changing a resolution by adding pixels in the in-plane direction and adding pixels in the time axis direction will be described below step by step.

Step 70a: The data indicating nine pixels (pixels 60a to 60i) within the image pickup element are added in the in-plans direction so as to generate data indicating one pixel 62.

Step 70b: Virtual addresses are set such that the number of the virtual addresses is greater than the number of actual addresses (virtual addresses are set by increasing the amount of the actual addresses). A virtual cutout part 65 is set in accordance with information for correcting the shaking motion (shaking motion information).

Step 70c: The data indicating image 61 is shifted over the virtual addresses in accordance with the information for correcting the shaking motion. In this case, data indicating a new pixel 66 is generated based on data indicating the original pixel 62 and data indicating surrounding pixels.

Figure 15:
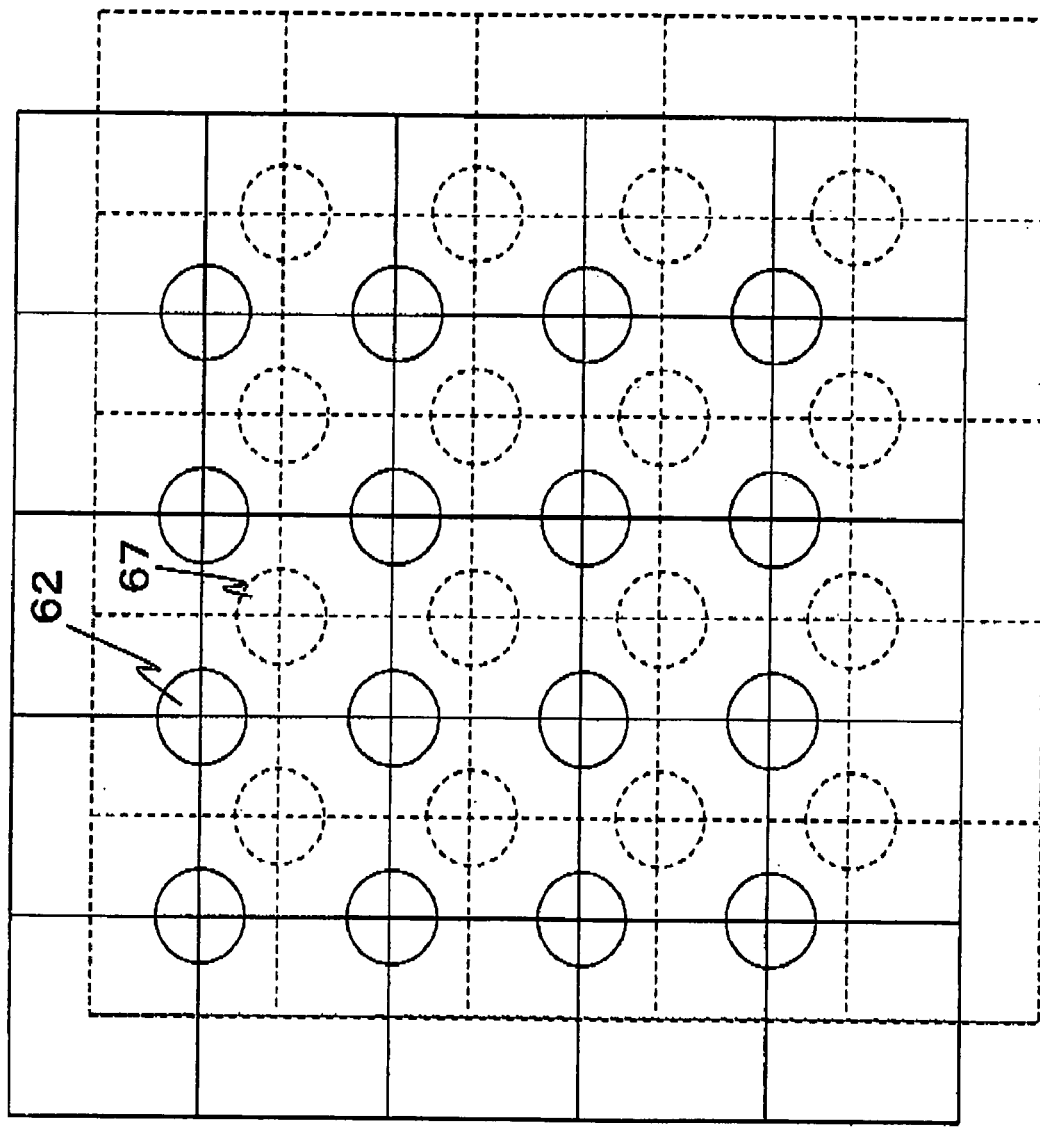
FIG. 15 is a view showing a principle for correcting the shaking motion, by setting the number of pixels which is larger than the number of actual pixels according to an embodiment of the present invention.

FIG. 15 shows a principle for correcting the shaking motion by setting the number of pixels which is larger than the number of actual pixels according to an embodiment of the present invention. The amount of shaking motion correction has a resolution of 1/10 of the pixel. In order to precisely perform the correction, virtual pixels 67 are generated by dividing the pixel 62 into 10 parts and the virtual pixels 67 are shifted.

After the virtual pixels 67 are shifted over a virtual space, the process proceeds to step 70d.

Step 70d: An image is cut out.

Step 70e: The data indicating a cutout image 64 is obtained. The data indicating a protruded part 68 is discarded.

Step 70f: The data indicating the cutout image 64 is stored in the main image memory 30. The amount of the correction of the shaking motion is stored in the main image memory 30.

Step 70g: When data indicating a new image 61a is input, the same process of steps 70a to 70d is performed.

Step 70h: The data indicating the cutout image 64a is obtained based on the amount of the correction of the shaking motion.

Step 70i: The data indicating a synthetic image 71 is obtained by adding (or integrating) data indicating pixels of the cutout image 64 and data indicating pixels of the cutout image 64a in the time axis direction.

Step 70j: The data indicating the synthetic image 71 is stored in the main image memory 30.

Step 70k: When data indicating a new image 61b is input, the same process of steps 70a to 70e is performed. Data indicating a cutout image 64b is obtained.

Step 70m: The data indicating a synthetic image 71a is obtained by adding data indicating pixels of the synthetic image 71 and data indicating pixels of the cutout image 64b in the time axis direction.

Step 70n: A shaking motion correction amount 72 is generated by calculating a first shaking motion correction amount 69, a second shaking motion correction amount 69a and a third shaking motion correction amount 69b. An overlapping region 73 in which three images are added in an overlapped manner is specified from the synthetic image 71a based on the shaking motion correction amount 72.

Step 70p: An enlarging interpolation is performed by performing a zooming calculation on the data indicating the overlapping region 73. As a result, data indicating an enlarged image 74 1s obtained. The details of the enlarging interpolation and the reducing interpolation will be described later.

The data indicating the static image 74 subjected to the correction of the shaking motion is obtained and the process is completed.

In the embodiment described with reference to FIG. 14, three images are integrated. However, the number of the images to be integrated is not limited to be three. For example, the longer the exposure time is, the larger number of images are integrated. By integrating the larger number of images, it is possible to take a picture in a dark place.

FIG. 16 shows a method for adding pixels in the in-plane direction. The addition in the in-plane direction includes an addition in a vertical direction and an addition in a horizontal direction.

FIG. 16(a) shows a method for the addition in the vertical direction. When reading pixels in the vertical direction, a vertical addition process is performed on R (red) (m, n+1) and R (m, n) so as to generate R (m, n+1)+R (m, n).

FIG. 16(b) shows a method for the addition in the horizontal direction. Pixels for the same color are added to each other in the horizontal direction. For example, a horizontal addition process is performed on G (m, n+1)+G (m, n) and G (m+1, n+1)+G (m+1, n) so as to generate G (m, n+1)+G (m, n)+G (m+1, n+1)+G (m+1, n).

As described with reference to FIG. 16, it is possible to generate data indicating one pixel from data indicating four pixels by performing the addition in the in-plane direction.

As will be described below, it is possible to cut out an image more accurately by shifting the cutout position of the image in the process for adding pixels in the in-plane direction.

Figure 17:
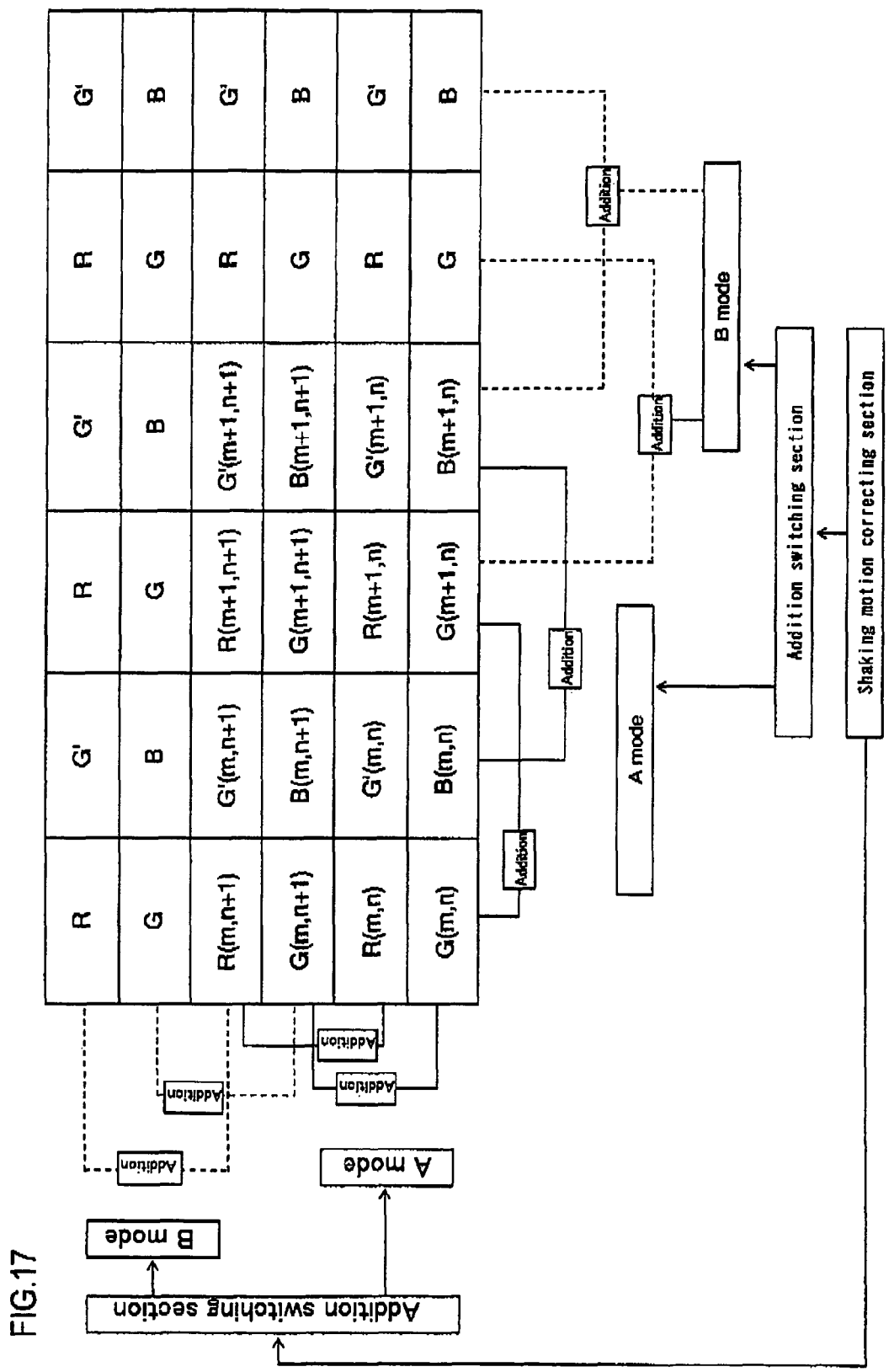
FIG. 17 is a diagram for explaining a shift of the cut-out position of an image.

FIG. 17 is a diagram for explaining a shift of the cutout position of an image.

The addition switching section 102a and the addition switching section 102b switch an addition mode between an A mode 103 and a B mode 104 in accordance with the correction signal or a detection signal (shaking motion information) output from the shaking motion detecting section 15 (see FIG. 1). Thus, in the process for adding pixels in the in-plans direction (see FIG. 16), it is possible to out an image more accurately by shifting the cutout position of the image by one pixel.

FIG. 18 shows a principle of a reducing interpolation, a principle of an enlarging interpolation and a principle of correcting the shaking motion with a high resolution. FIG. 18(a) shows the principle of the reducing interpolation. It is possible to obtain a plurality of (six) pixels as the result of the reducing interpolation from the original (eight) pixels. FIG. 18 (b) shows the principle of the enlarging interpolation. It is possible to obtain a plurality of (eight) pixels as the result of the enlarging interpolation from the original (six) pixels, FIG. 18(c) shows the principle of correcting the shaking motion with a high resolution.

10. Removal of Image for which the Shaking Motion Fails to be Detected

Figure 19:
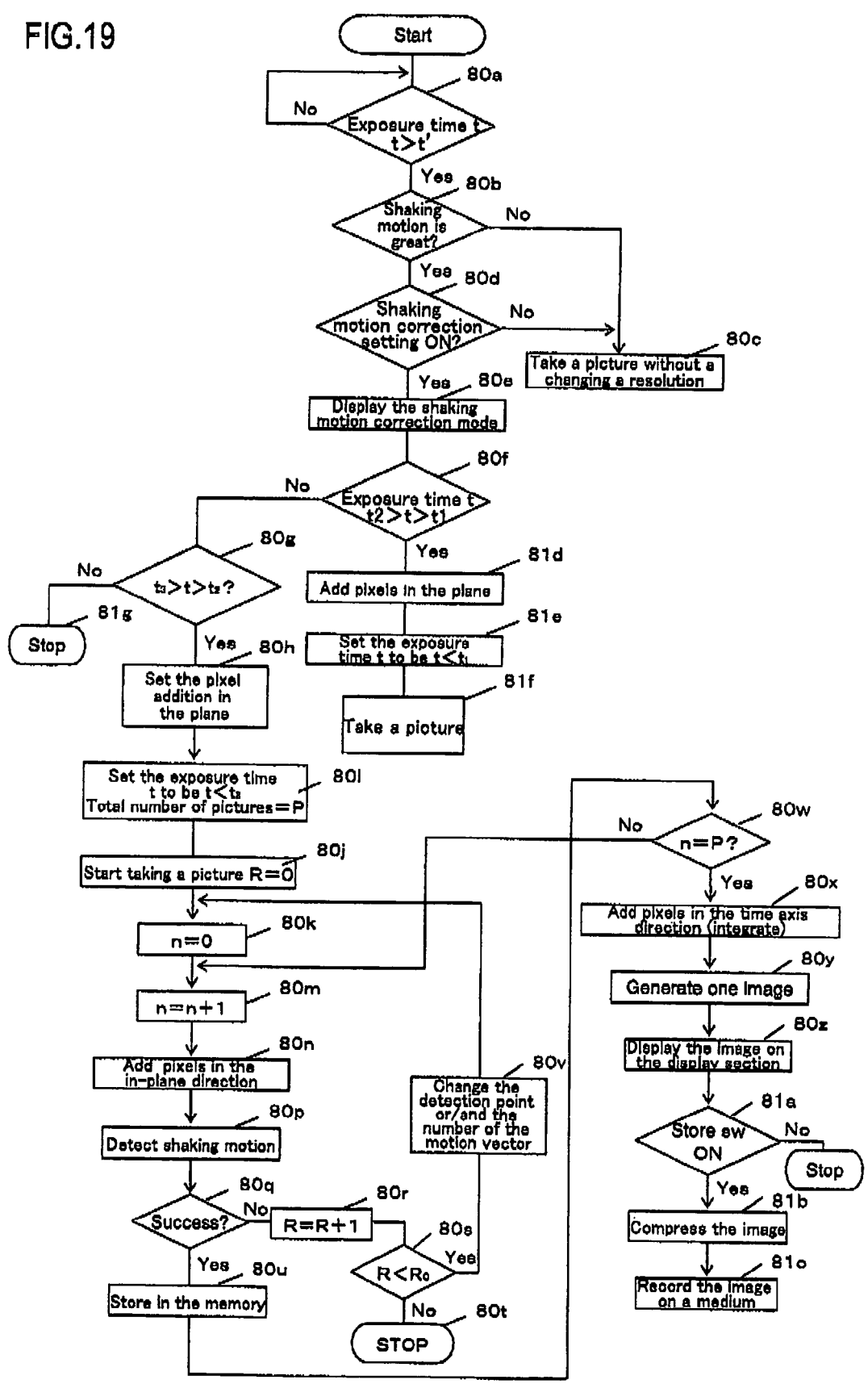
FIG. 19 is a flowchart showing a procedure of a process for removing an image for which the detection of the shaking motion fails.

FIG. 19 shows a procedure of a process for removing an image for which the detection of the shaking motion fails.

With reference to FIG. 19, the procedure for the process for removing an Image for which the detection of the shaking motion fails will be described below step by step.

Step 80a: It is determined whether or not a shutter speed (exposure time) is longer than t'.

If the shutter speed (the exposure time) is longer than t' (Yes), then the process proceeds to step 80b.

Step 80b: It is determined whether or not the shaking motion occurs radically.

If the shaking motion does not occur radically (No), then the process proceeds to step 80c. If the shaking motion occurs radically (Yes), then the process proceeds to step 80d.

Step 80c: A picture is taken while the resolution is set to a resolution which is preset.

Step 80d: It is determined whether or not the correction of the shaking motion is performed with priority. If the setting for performing the correction of the shaking motion is turned ON (Yes), then the process proceeds to step 80e. If the setting for performing the correction of the shaking motion is not turned ON (No), then the process proceeds to step 80c.

Step 80e: A shaking motion correction mode is displayed.

Step 80f: It is determined whether or not the exposure time t is set to be $t_1 < t < t_2$.

If the exposure time t is set to be $t_1 < t < t_2$ (Yes), then the process proceeds to the step 81d. Then, the pixels are added in the in-plane direction (step 81d), the exposure time t is set to be $t < t_1$ (step 81e) and taking a picture is started (step 81f).

If the exposure time t is not set to be $t_1 < t < t_2$ (No), then the process proceeds to the step 80g where it is determined whether or not the exposure time is set to be $t_2 < t < t_3$. If the exposure time t is not set to be $t_2 < t < t_3$ (No), then the process is stopped (step 81g). If the exposure time t is set to be $t_2 < t < t_3$ (Yes), then the process proceeds to step 80h.

Step 80h: The setting for adding pixels in the in-plane direction is performed.

Step 80i: The exposure time t is set to be $t < t_2$ and the number of pixels P to be taken for the correction of the shaking motion is obtained.

Step 80j: Taking a picture is started. R is set to be 0 (R=0).

Step 80k: n is set to be 0 (n=0).

Step 80m: n is incremented by one (n=n+1).

Step 80n: The pixels in the n-th image are added in the in-plane direction.

Step 80p: The shaking motion is detected.

Step 80q: It is determined whether or not the shaking motion is successfully detected.

If the detection of the shaking motion fails (No), R=R+1 (Step 80r) and it is determined whether or not $R < R_0$ is satisfied (whether or not R is smaller than a set value $R_0$). If $R < R_0$ is not satisfied (No), then the process is stopped (step 80t). If $R < R_0$ is satisfied (Yes), then at least one of a detection point of a motion vector and the number of motion vector detections is changed (step 80v) and the process proceeds to step 80k in order to perform correction process again from the beginning.

If the detection of the shaking motion is successful (Yes), then the process proceeds to step 80u.

Step 80u: The corrected image is stored in the main image memory 30.

Step 80w: It is determined whether or not n is equal to P (whether or not n=P is satisfied).

If n=P is not satisfied (No), then the process proceeds to step 80m. If n=P is satisfied (Yes), then it is determined that a process for all images (all divided images) taken for correcting the shaking motion is completed. Then, the process proceeds to step 80x.

Step 80x: The corrected images stored in the main image memory 30 are added or integrated in the time axis direction.

Step 80y: Data indicating one image is generated.

Step 80z: A process such as a decimation process is performed on the generated data indicating one image, and the result is displayed on the display section 12.

Step 81a: An operator determines whether or not an image storage switch is turned ON.

Stop 81b: A compression process (e.g., JPEG and the like) is performed on the image data indicating an image so as to reduce the amount of the image data.

Step 81c: The image data is recorded on the recording medium 14 (e.g., an IC card).

As described above with reference to FIG. 19, according to the embodiment of the present invention, it is possible to prevent the addition (integration) of the corrected image data for which the detection of the shaking motion fails. For example, in the case where it is difficult to detect the failure such as a failure to detect the addition (integration) of pixels in the time axis direction, it is possible to obtain an image subjected to the correction of the shaking motion. Further, it is possible to start the integration in the time axis direction from a next image to the image for which the detection of the shaking motion fails. Therefore, the use of time is more efficient.

11. Display of Shaking Motion Correction Amount

Figure 20:
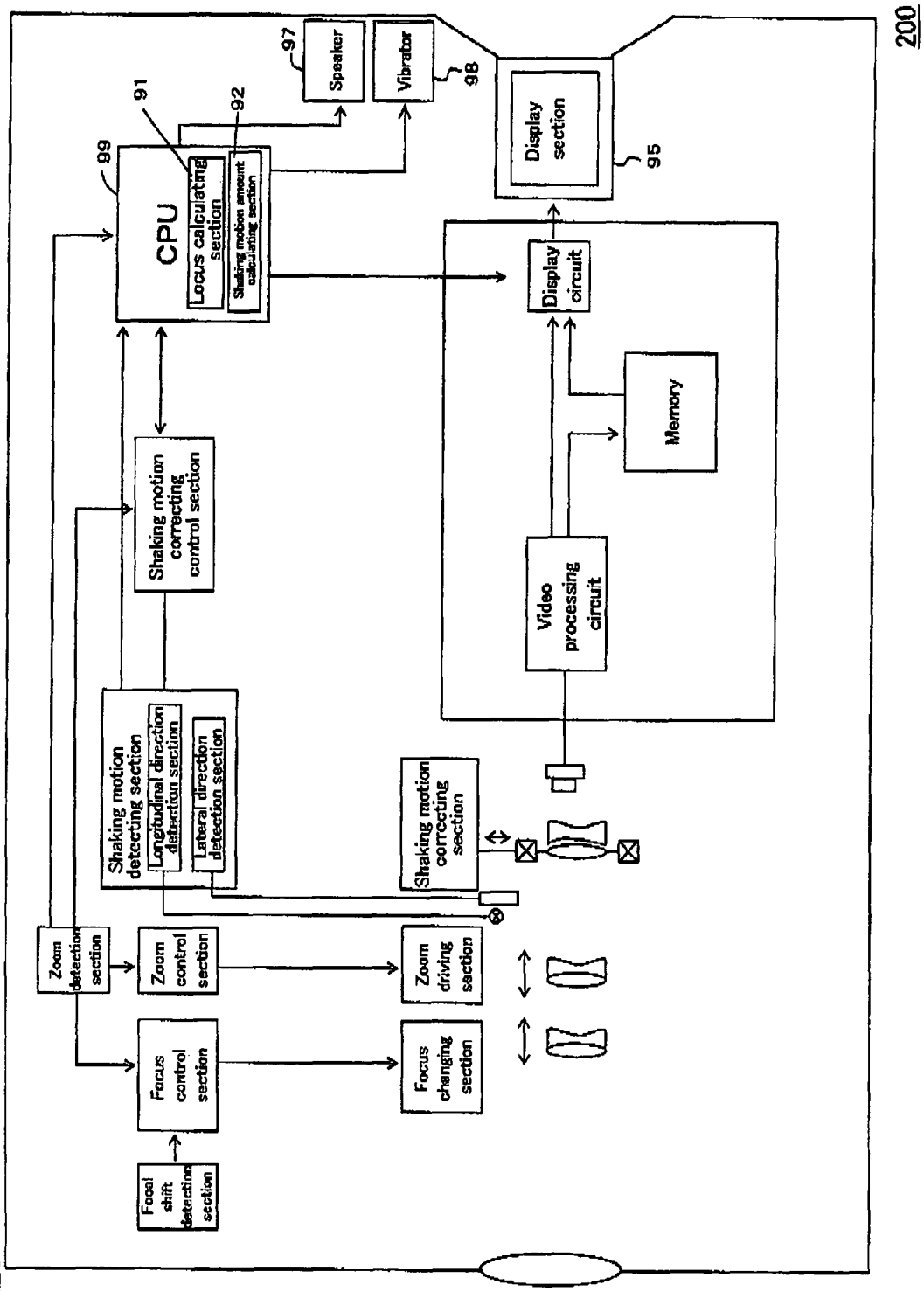
FIG. 20 is a diagram showing a structure of an image pickup apparatus 200 according to an embodiment of the present invention.

FIG. 20 shows a structure of an image pickup apparatus 200 according to an embodiment of the present invention.

The image pickup apparatus 200 can display an amount of the correction of the shaking motion in a similar manner as the image pickup apparatus 100. The image pickup apparatus 200 includes a shaking motion amount calculating section 92, a locus calculating section 91, a display section 95, a speaker 97, a vibrator 98, a CPU 99, an oscillating gyro 101a, and an oscillating gyro 101b.

The shaking motion amount calculating section 92 (the shaking motion detecting section 15: see FIG. 1) calculates a shaking motion amount and outputs the shaking motion amount to the display section 95 via a display circuit. The locus calculating section 91 calculates a locus of the shaking motion which cannot be perfectly corrected by the shaking motion correction and outputs the locus to the display section 95 via the display circuit.

The CPU 99 determines whether or not the shaking motion amount is larger than a predetermined value. If the shaking motion amount is larger than the predetermined value, then it instructs at least one of the display section 95, the speaker 97 and the vibrator 98 to output the determination result.

The display section 95 displays the determination result in accordance with the instruction from the CPU 99. The speaker 97 generates a warning sound in accordance with the instruction from the CPU 99. The vibrator 98 vibrates in accordance with the instruction from the CPU 99.

Figure 21:
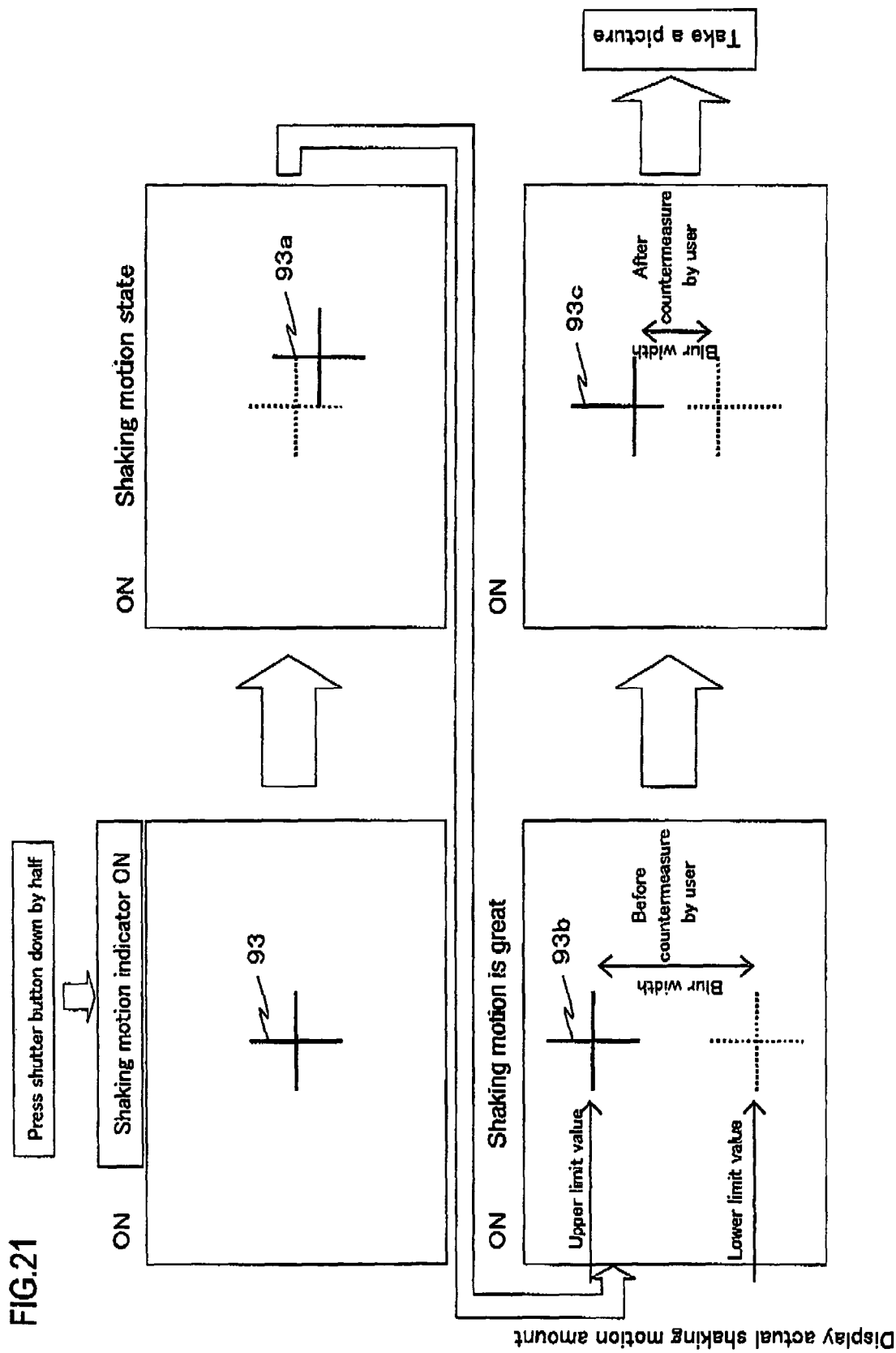
FIG. 21 is a diagram showing an example of the display section 95 included in the image pickup apparatus 200.

FIG. 21 shows an example of a display section 95 included in the image pickup apparatus 200.

In the display section 95, the shaking motion amount is displayed by indicators 93, 93a, 93b and 93c. By visually observing the display, a person who takes a picture can recognize a shaking motion amount and a shaking motion direction. By recognizing the shaking motion amount and the shaking motion direction, the person can change a method for fixing a camera. As a result, it is possible to obtain a static image containing shaking motion less than usual by the human operation.

Figure 22:
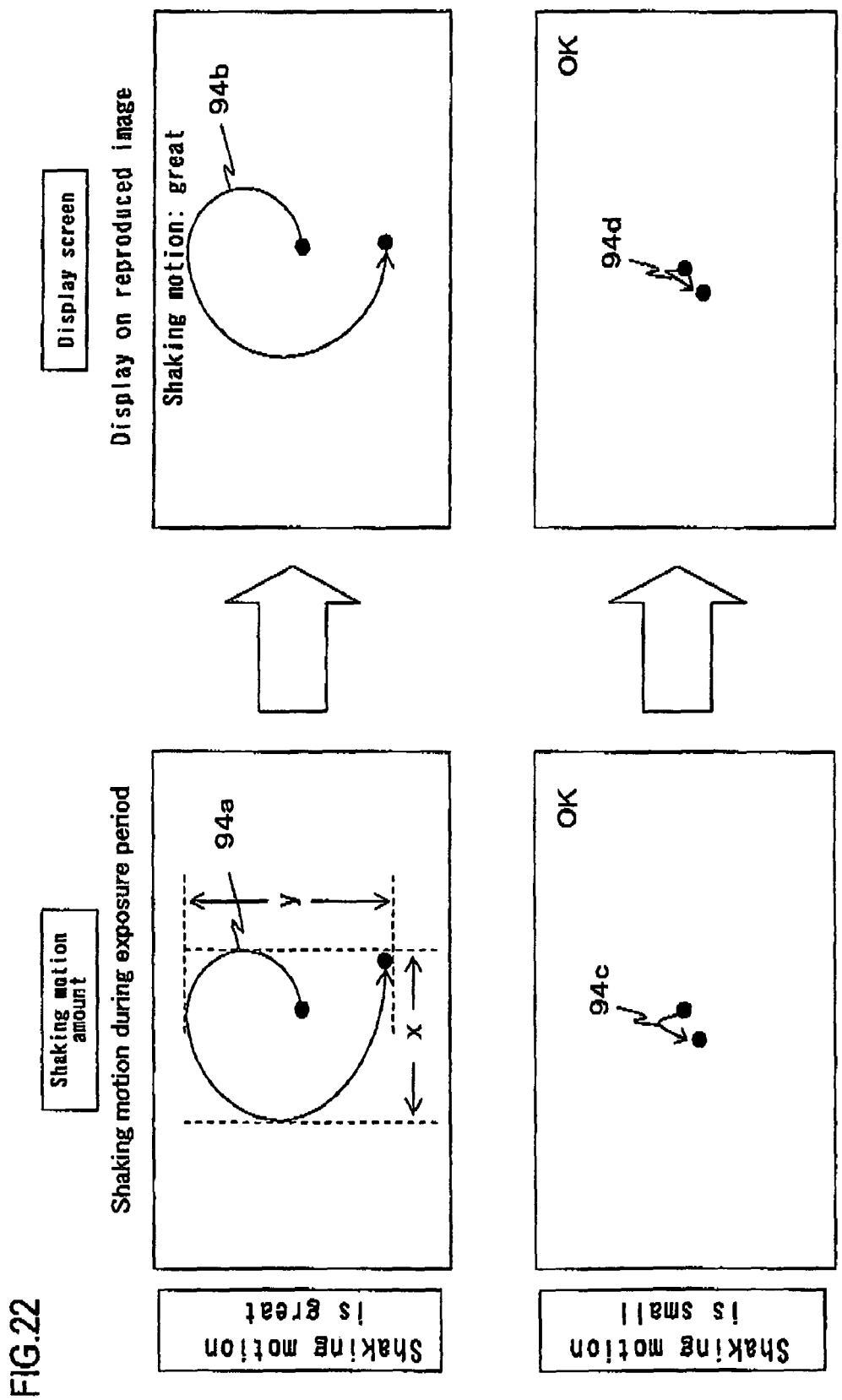
FIG. 22 is a diagram showing another example of the display section 95 included in the image pickup apparatus 200.

FIG. 22 shows another example of a display section 95 included in the image pickup apparatus 200.

In the display section 95, the locus of the shaking motion which cannot be perfectly corrected by the shaking motion correction is displayed, like a locus 94b and a locus 94d. By visually observing the display, a person who takes a picture can recognize the degree of a static image subjected to the shaking motion after taking a picture. The failure of the shaking motion correction can be confirmed by a small display section of the camera. Therefore, the person can check the failure of the shaking motion correction. In the case of a filming mode (e.g., panning or panoramic view), it is possible to check only the shaking motion in the longitudinal direction.

In the display section 95, if a shaking motion amount (x, y) is larger than a predetermined value $(x_0, y_0)$ $((x>x_0$ or $y>y_0)$ or $(x>x_0$ and $y>y_0))$, then a warning may be displayed. Further, the speaker may output a warning sound. The predetermined value $(x_0, y_0)$ is set, for example, in accordance with a zoom ratio.

Further, in the display section 95, if a shaking motion amount (x, y) is smaller than the predetermined value $(x_0, y_0)$ $((x<x_0$ or $y<y_0)$ or $(x<x_0$ and $y<y_0))$, then a message (e.g., "OK") maybe displayed. Further, the speaker may output a sound. The predetermined value $(x_0, y_0)$ is set, for example, in accordance with a zoom ratio.

FIG. 23 shows a display of a boundary indicator 97 for taking a picture in a panning manner or in a panoramic manner.

FIG. 23(a) shows a scene to be taken, which is divided into three frames.

FIG. 23(b) shows a frame 98a. FIG. 23(c) shows a frame 98b. FIG. 23(d) shows a frame 98c. FIG. 23(e) shows a frame 98d.

When the scene shown in FIG. 23(a) is to be taken in a panoramic manner in a rightward direction, the detection point 96a, among the detection points 96a, 96b and 96c (see FIG. 23(b)) which are representative points for detecting a motion vector for the shaking motion correction, is moved over the frames and reaches a left end of the frame 98b (see FIG. 23(c)). At this time, the shaking motion detecting section 15 for detecting a motion detects that a screen is shifted to the right by L1, and a boundary indicator 97a indicating a boundary of a right end of the frame in FIG. 23(b) is displayed at a position spaced apart from a right end of the frame by L1 (see FIG. 23(c)).

Similarly, the shaking motion detecting section 15 detects that the screen is shifted to the right by L2, and a boundary indicator 97b is displayed at a position spaced apart from the right end of the frame by L2 (see FIG. 23(d)).

Similarly, a boundary indicator 97c is displayed at the left end of the screen in FIG. 23 (e). In this stage, the person who takes a picture can know that a current position reaches the next position where the next picture is to be taken. If necessary, it is possible to output a sound alert from the speaker 37 (see FIG. 1), thereby notifying the person of the sound alert. At this time, the person can take a picture of panoramic form almost perfectly by pressing down the shutter button.

The method has been described for setting a plurality of detection points over the screen and determining the movement of the person who takes a picture as a motion in the frame from the motion vector of the detection points.

In this method, the detection of a panning is performed by the shaking motion detecting section for correcting the shaking motion. However, as shown in FIG. 20, in the image pickup apparatus for detecting the shaking motion by using the oscillating gyro 101a and the oscillating gyro 101b, it is also possible to detect a panning rotation angle of the person by the oscillating gyros and to obtain a rotation angle $\theta_0$ required for the panning in a transverse direction for one frame in accordance with the zoom ratio of the zoom detecting section.

In the state shown in FIG. 23(b), the boundary indicator 97 is displayed at the right end. In this state, the person takes a picture for the first frame in the panoramic picture. Next, when the person performs the panning (i.e., rotation) of the camera by the rotation angle $\theta_0$ in the rightward direction, the person can know that a current position of the camera reaches a position where the person can take a picture for the second frame in the panoramic picture.

When the rotation angle reaches the rotation angle $\theta_0$, the boundary indicator 97c is displayed at the left end (see FIG. 23(e)). At this time, the person is notified that the rotation angle reaches the rotation angle $\theta_0$ via the speaker or the display. As a result of the person pressing the shutter button at this time, it is possible to obtain a panoramic picture which Is accurate in the transverse direction.

By displaying, on the display section 12, boundary indicators 99a and 99b in the vertical direction in addition to the transverse direction, it is possible for the person to easily obtain a panoramic picture which is accurate in both of the directions (see FIG. 23(b)). In this case, by displaying an accurate panning direction using an arrow on the display screen, the person can easily take pictures in a panoramic manner by only directing the camera in the direction indicated by the arrow. In general, since the person holds the camera with their hand when taking a picture, the person cannot accurately determine the direction in which the picture is to be taken. However, by automatically adjusting the left, right, upper and lower ends of the screen using the shaking motion correcting function of the camera, it is possible to take pictures in a panoramic manner very accurately.

Even if the left, right, upper and lower ends of the screen are automatically adjusted using the shaking motion correcting function of the camera, an error occurs between a panoramic scene which has actually been captured and the most ideal panoramic scene which can be captured. By additionally recording the error in the attribute data (Exif and the like) indicating the attribute of the state in which the picture Is taken, It is possible to align the left, right, upper and lower ends of the screen more accurately when synthesizing a plurality of images into a single panoramic image. This is because the error can be modified based on the error information.

The function described above can be also realized in a similar manner when the shaking motion detecting method is an electronic detecting method.

Figure 24:
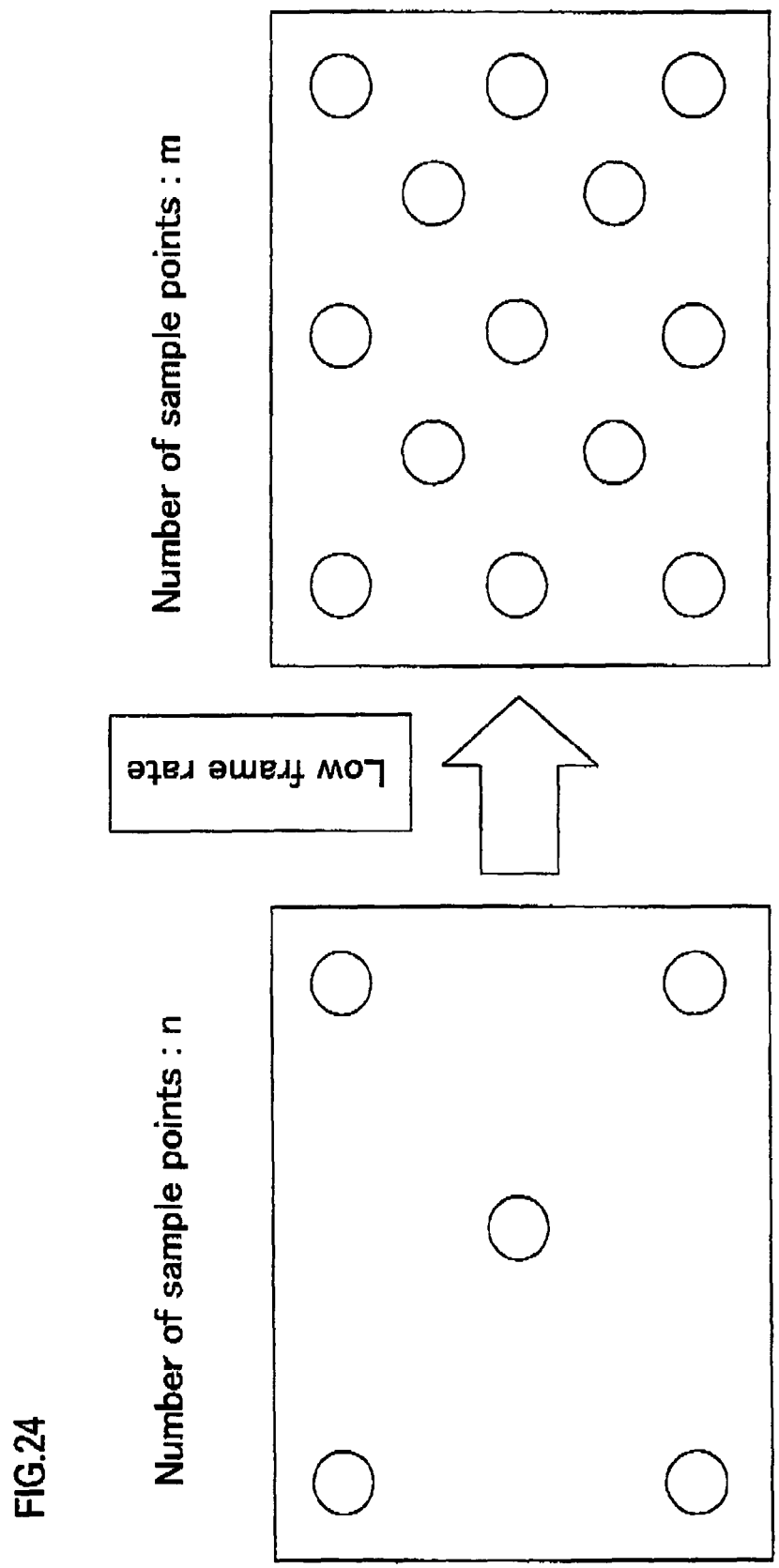
FIG. 24 Is a diagram showing a detection point for detecting the shaking motion within a frame.

FIG. 24 shows a detection point for detecting the shaking motion within a frame. When the detection of the shaking motion fails frequently or the frame rate is low, it is possible to increase a success rate of the detection of the shaking motion by changing the respective positions of the detection points 96 within the frame 98 or by increasing the number of the detection points 96 within the frame 98.

Thus, according to the image pickup apparatus of the present invention, a person who takes a picture can recognize the extent of the shaking motion. By recognizing the degree of the shaking motion, the person can change a method for fixing a camera. As a result, it is possible to obtain a static image having shaking motion which is lees than that which would be usually observed by a human operation.

As described above, in the chapter titled (11. Display of shaking motion amount), the exemplary embodiment of the present invention has been described with reference to FIG. 1 and FIGS. 20 to 23.

For example, in the embodiment shown in FIG. 1 and FIGS. 20 to 23, the shaking motion detecting section 15 (the shaking motion amount calculating section 92) corresponds to "the shaking motion amount detecting section for detecting an amount of shaking motion between a plurality of frames representing a static image taken", the CPU 99 corresponds to "the determining section for determining whether or not the amount of the shaking motion is larger than a predetermined value", and the display section 95, the speaker 97 and the vibrator 98 correspond to "the output section for outputting a result of the determination".

However, the image pickup apparatus of the present invention is not limited to the embodiment shown in FIG. 1 and FIGS. 20 to 23. Each of the components included in the image pickup apparatus can have an arbitral configuration as long as the image pickup apparatus has each of the functions of "the shaking motion amount detecting section for detecting an amount of shaking motion between a plurality of frames representing a static image taken", "the determining section for determining whether or not the amount of the shaking motion is larger than a predetermined value", and "the output section for outputting a result of the determination".

The following image pickup apparatus can also be included within the range of the present invention.

An image pickup apparatus for taking a static image during a predetermined exposure period, including: a shaking motion amount detecting section for detecting an amount of shaking motion between a plurality of frames representing the static image; and a display section for displaying the detected amount of the shaking motion after the predetermined exposure period passes.

An image pickup apparatus for taking a static image during a predetermined exposure period, including: a shaking motion amount detecting section for detecting an amount of shaking motion between a plurality of frames representing the static image; a determination section for determining whether or not the amount of the shaking motion is larger than a predetermined value; and an output section for outputting a result of the determination.

For example, the output section displays the result of the determination when it is determined that the mount of the shaking motion is larger than the predetermined value.

For example, the output section generates a sound when it is determined that the amount of the shaking motion is larger than the predetermined value.

For example, the output section vibrates when it is determined that the amount of the shaking motion is larger than, the predetermined value.

As described above, the present invention is exemplified by the use of its preferred embodiments. However, the present invention should not be interpreted solely based on the embodiments described above. It is understood that the scope of the present invention should be interpreted solely based on the claims. It is also understood that those skilled in the art can implement equivalent scope of technology, based on the description of the present invention and common knowledge from the description of the detailed preferred embodiments of the present invention. Furthermore, it is understood that any patent, any patent application and any references cited in the present specification should be incorporated by reference in the present specification in the same manner as the contents are specifically described therein.

INDUSTRIAL APPLICABILITY

According to the information generating apparatus, the image pickup apparatus and the image pickup method of the present invention, it is possible to correct the shaking motion of information indicating a plurality of frames and to generate information indicating a static image. As a result, it is possible to obtain a static image which is subjected to the correction of the shaking motion.

The present invention takes a plurality of images during a predetermined exposure period and corrects the shaking motion for each of the plurality of images. By performing a calculation process on a plurality of corrected images, it is possible to obtain one static image. As a result, it is possible to obtain a static image which is subjected to the correction of the shaking motion and which has high S/N.

According to the present invention, when a frame rate is low at the time when the shaking motion is corrected, a clock speed is increased or a resolution is reduced so as to increase the frame rate. Accordingly, it is possible to reduce a degradation of the image quality due to an electronic correction for the shaking motion.

According to the image pickup apparatus of the present Invention, a person who takes a picture can recognize a degree of the shaking motion. By recognizing the degree of the shaking motion, the person can change a method for fixing the camera. As a result, it is possible to obtain a static image having shaking motion less than usual by a human operation.

The invention claimed is:

1. An image generating apparatus comprising:
    a storage section for storing a plurality of frame information;
    an information generating section for generating static image information indicating a static image based on the plurality of frame information stored in the storage section, wherein the plurality of frame information is information indicating a plurality of frames representing a static image taken during a predetermined exposure period, and the information has been corrected by setting a number of virtual pixels included in each of the plurality of frames to be larger than a number of actual pixels included in an image pickup plane of an image pickup element in accordance with an amount of shaking motion between the plurality of frames, and wherein the number of virtual pixels is set based on a ratio of a predetermined actual pixel size to the amount of shaking motion between the plurality of frames; and
    a resolution changing section for changing a set resolution of the plurality of frames in accordance with the amount of shaking motion, wherein the set resolution is reduced to a predetermined resolution, after which, a frame rate for taking the plurality of frames is increased.

2. The image generating apparatus according to claim 1, wherein the information generating section generates the static image information by simultaneously calculating the plurality of frame information stored in the storage section.

3. The image generating apparatus according to claim 1, wherein the information generating section generates the static image information by sequentially calculating each of the plurality of frame information stored in the storage section.

4. The image generating apparatus according to claim 1, wherein the plurality of frame information are generated based on a summation of information indicating a plurality of actual pixels included in the image pickup plane of the image pickup element in at least one of a horizontal direction and a vertical direction.

5. An image pickup apparatus for taking a static image during a predetermined exposure period, comprising:
- a shaking motion detecting section for detecting an amount of shaking motion between a plurality of frames representing the static image;
- a shaking motion correcting section for correcting a plurality of frame information indicating the plurality of frames by setting a number of virtual pixels included in each of the plurality of frames to be larger than a number of actual pixels included in an image pickup plane of an image pickup element in accordance with the detected amount of the shaking motion,
- wherein the number of virtual pixels is set based on a ratio of a predetermined actual pixel size to the amount of shaking motion between the plurality of frames;
- a storage section for storing the plurality of frame information subjected to the correction of the shaking motion;
- an information generating section for generating static image information indicating the static image based on the plurality of frame information stored in the storage section; and
- a resolution changing section for changing a set resolution of the plurality of frames in accordance with the amount of shaking motion,
- wherein the set resolution is reduced to a predetermined resolution, after which, a frame rate for taking the plurality of frames is increased.

6. The image pickup apparatus according to claim 5, wherein the information generating section generates the static image information by simultaneously calculating the plurality of frame information stored in the storage section.

7. The image pickup apparatus according to claim 5, wherein the information generating section generates the static image information by sequentially calculating each of the plurality of frame information stored in the storage section.

8. The image pickup apparatus according to claim 5, further comprising a frame rate changing section for changing the frame rate in accordance with the amount of the shaking motion, wherein the frame rate indicates the number of the plurality of frames representing the static image taken per unit time.

9. The image pickup apparatus according to claim 5, wherein the resolution changing section for changing a resolution of the plurality of frames in accordance with a brightness.

10. The image pickup apparatus according to claim 9, wherein the resolution changing section for changing a resolution of the plurality of frames in accordance with a zoom ratio.

11. The image pickup apparatus according to claim 5, wherein the shaking motion detecting section detects the amount of the shaking motion based on a summation of information indicating a plurality of pixels included in the image pickup plane of the image pickup element, and the shaking motion correcting section corrects the plurality of frame information by cutting out a part of the plurality of frame information in accordance with the amount of the shaking motion.

12. The image pickup apparatus according to claim 5, wherein the shaking motion detecting section detects the amount of the shaking motion based not on information generated based on a plurality of pixels included in the image pickup plane of the image pickup element.

13. The image pickup apparatus according to claim 5, further comprising a determining section for determining whether or not the predetermined exposure time is greater than a predetermined value, and
- wherein, when it is determined that the predetermined exposure time is greater than the predetermined value, the shaking motion detecting section detects the amount of the shaking motion based on a summation of information indicating a plurality of pixels included in the image pickup plane of the image pickup element.

14. An image pickup method for taking a static image during a predetermined exposure period, comprising the steps of:
- detecting an amount of shaking motion between a plurality of frames representing the static image;
- changing a set resolution of the plurality of frames in accordance with the amount of shaking motion;
- reducing the set resolution to a predetermined resolution, after which, increasing a frame rate for taking the plurality of frames;
- correcting a plurality of frame information indicating the plurality of frames by setting a number of virtual pixels included in each of the plurality of frames to be larger than a number of actual pixels included in an image pickup plane of an image pickup element in accordance with the detected amount of the shaking motion,
- wherein the number of virtual pixels is set based on a ratio of a predetermined actual pixel size to the amount of shaking motion between the plurality of frames;
- storing the plurality of frame information subjected to the correction of the shaking motion; and
- generating static image information indicating the static image based on the plurality of frame information stored in the storage section.

* * * * *